United States Patent
Alavi et al.

(10) Patent No.: US 12,421,357 B1
(45) Date of Patent: Sep. 23, 2025

(54) FIBER-CONTAINING PRODUCTS MADE WITH SUGAR-ALCOHOL-CONTAINING BINDER COMPOSITIONS

(71) Applicant: JOHNS MANVILLE, Denver, CO (US)

(72) Inventors: Kiarash Alavi, Littleton, CO (US); Ameya Natu, Highlands Ranch, CO (US); Uranchimeg Lester, Littleton, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 18/592,701

(22) Filed: Mar. 1, 2024

Related U.S. Application Data

(62) Division of application No. 17/147,675, filed on Jan. 13, 2021, now Pat. No. 11,958,949.

(51) Int. Cl.
| | |
|---|---|
| *C08J 5/04* | (2006.01) |
| *C08J 3/24* | (2006.01) |
| *C08J 5/18* | (2006.01) |
| *C08K 5/053* | (2006.01) |

(52) U.S. Cl.
CPC .............. *C08J 5/043* (2013.01); *C08J 3/24* (2013.01); *C08J 5/18* (2013.01); *C08K 5/053* (2013.01); *C08J 2333/02* (2013.01)

(58) Field of Classification Search
None
See application file for complete search history.

(56) References Cited

U.S. PATENT DOCUMENTS

| | | | |
|---|---|---|---|
| 5,318,990 A | 6/1994 | Strauss | |
| 6,136,916 A * | 10/2000 | Arkens | C08F 8/14 |
| | | | 524/556 |
| 6,331,350 B1 | 12/2001 | Taylor et al. | |
| 6,933,349 B2 | 8/2005 | Chen et al. | |
| 11,958,949 B2 | 4/2024 | Alavi et al. | |
| 2009/0324915 A1 | 12/2009 | Swift et al. | |
| 2019/0382628 A1 | 12/2019 | Alavi et al. | |

* cited by examiner

*Primary Examiner* — Jeffrey D Washville
(74) *Attorney, Agent, or Firm* — Robert D. Touslee

(57) ABSTRACT

Fiber-containing products are described that include a cured binder formed from a binder composition that may include a sugar alcohol having three or more carbon atoms, and a polymeric polycarboxylic acid. The binder composition may be characterized by a mole ratio of hydroxyl groups to carboxylic acid groups greater than or about 1.1:1. The fiber-containing product may also be characterized by a thermal stability that is greater than a comparative fiber-containing product made with a comparative cured binder that includes the polymeric polycarboxylic acid but lacks the sugar alcohol. The fiber-containing products may include thermal insulation products such as building insulation, pipe insulation, duct insulation, and appliance insulation.

11 Claims, 12 Drawing Sheets

FIBER-CONTAINING PRODUCTS MADE WITH SUGAR-ALCOHOL-CONTAINING BINDER COMPOSITIONS

CROSS-REFERENCES TO RELATED APPLICATIONS

This application is a division of pending U.S. application Ser. No. 17/147,675 filed Jan. 13, 2021. The entire contents of the above-identified application are herein incorporated by reference for all purposes.

TECHNICAL FIELD

The present technology relates to fiber-products made with sugar-alcohol-containing binder compositions. Embodiments of the present technology includes fiberglass insulation products made from binder compositions that include at least one sugar alcohol and at least one polycarboxylic acid compound.

BACKGROUND

Fiber-containing products for thermal insulation often include a cured binder to hold the fibers in place. In conventional fiber-containing products, the cured binder is made from a binder composition that includes formaldehyde-containing compounds such as phenol formaldehyde and urea formaldehyde. Unfortunately, these formaldehyde-containing binder compositions release undesirable amounts of formaldehyde into the air both during binder curing operations and after the product is made. These formaldehyde releases are increased in fiber-containing products used as thermal insulation for articles that periodically experience high temperatures such as hot pipes, ovens, and dryers. Thus, there has been a lot of research and development of alternative binder compositions that include little or no formaldehyde-containing compounds.

Attempts to develop alternative binder compositions for fiber-containing products used as thermal insulation include replacing the formaldehyde-containing compounds with natural products such as sugars, starches, proteins, and organic acids derived from plants. Unfortunately, many insulation products made with these binder compositions perform poorly in high-temperature applications where the temperatures climb high enough to cause the insulation product to become thermally unstable. In many instances, the thermal instability lead to permanent degradation of the product's insulative properties. In extreme cases, the thermal instability can lead to the product catching fire. Thus, there remains a need for new binder compositions containing little or no formaldehyde that produce thermally-stable cured binders in fiber-containing products used as thermal insulation.

SUMMARY

The present technology includes fiber-containing products that are characterized by low emissions of volatile organic compounds, high thermal stability at high temperatures, and high mechanical strength under hot, humid conditions over extended periods of time. This combination of characteristics make the present fiber-containing products well suited for thermally insulating objects that regularly experience high temperatures such as hot pipes, hot ducts, and appliances like ovens, clothes dryers, and dishwashers. These characteristics may be attributed to the binder compositions used in making the fiber-containing product as well as the operations for curing the binder compositions. In embodiments, the binder composition may include a sugar alcohol and a polycarboxylic acid compound that may be combined to give a mole ratio of hydroxyl groups to carboxyl groups in the binder composition that is greater than or about 1.1:1. The binder compositions may be cured at temperatures greater than or about 230° C. for curing times of less than or about 1 minute to make a fiber-containing product that includes a cured binder in which substantially all the sugar alcohols may be polymerized.

Embodiments of the present technology include fiber-containing products having a cured binder formed from a binder composition that includes a sugar alcohol. The binder composition may also include at least one polymeric polycarboxylic acid. In additional embodiments, the at least one polymeric polycarboxylic acid may be at least one homopolymer or copolymer of at least one unsaturated carboxylic acid or anhydride selected from the group consisting of acrylic acid, maleic acid, maleic anhydride, itaconic acid, itaconic anhydride, methacrylic acid, fumaric acid, and crotonic acid. In further embodiments, the at least one polymeric polycarboxylic acid may include a polyacrylic acid polymer. The sugar alcohol and the polymeric polycarboxylic acid may be combined to give a mole ratio of hydroxyl groups to carboxylic acid groups in the binder composition that may be greater than or about 1.1:1. In additional embodiments, the mole ratio of the hydroxyl groups to the carboxylic acid groups in the binder composition may be greater than or about 1.25:1.

The fiber-containing product may be characterized by a thermal stability that is greater than a comparative fiber-containing product made with a comparative cured binder that includes the polymeric polycarboxylic acid but lacks the sugar alcohol. In additional embodiments, the cured binder may be characterized by a humid-aged retention greater than or about 35%. In embodiments, the fiber-containing product may be a thermal insulation product. In further embodiments, the fiber-containing product may be a thermal insulation product such as building insulation, pipe insulation, duct insulation, or appliance insulation.

Embodiments of the present technology may also include fiber-containing products that include glass fibers and a cured binder composition. The cured binder composition may be formed from a binder composition that may include a sugar alcohol and a polyacrylic acid polymer. In additional embodiments, the sugar alcohol may include at least one sugar alcohol selected from sorbitol, mannitol, xylitol, maltitol, glycerol, erythritol, threitol, arabitol, ribitol, galactitol, fucitol, iditol, inositol, volemitol, isomalt, lactitol, maltotritol, maltotetraitol, and polyglycitol. In further embodiments, the sugar alcohol may include sorbitol. In still further embodiments, the polyacrylic acid polymer may include at least on polyacrylic acid polymer selected from a polyacrylic acid homopolymer and a polyacrylic-and-maleic acid copolymer. The binder composition may be characterized by a mole ratio of hydroxyl groups to carboxylic acid groups greater than or about 1.1:1. In additional embodiments, the binder composition may be catalyst free. In still additional embodiments, the binder composition may be neutralization-agent free. In yet additional embodiments, the binder composition may be free of long-chain polyols having a molecular weight greater than or about 1500 Daltons. The fiber-containing products may be thermally stable at a temperature less than or about 230° C. In embodiments, the fiber-containing products may be a thermal insulation products. In further embodiments, the fiber-containing products may be a thermal insulation products such as building insulation, pipe insulation, duct insulation, or appliance insulation.

Embodiments of the present technology also include methods of making a fiber-containing product. The methods may include contacting the fibers with a binder composition. The binder composition may include a sugar alcohol and a polyacrylic acid polymer, and may have a mole ratio of hydroxyl groups to carboxylic acid groups greater than or about 1.1:1. In additional embodiments, the sugar alcohol may include sorbitol. In still further embodiments, the polyacrylic acid polymer may have a molecular weight greater than or about 1000 Daltons. In yet further embodiments, the binder composition may be one or both of neutralization-agent free and catalyst free. The combination of the fibers with the binder forms a fiber-binder amalgam that may be cured at a curing temperature greater than or about 230° C. In additional embodiments, the curing temperature for the fiber-binder amalgam may be greater than or about 240° C. The curing fiber-binder amalgam may release volatile organic compounds (VOCs) in an amount less than or about 0.2 wt. %, based on the weight of the binder composition. In additional embodiments, the VOCs may be formaldehyde free. In still further embodiments, the fiber-containing product may be characterized by a thermal stability of greater than or about 100 minutes at a temperature greater than or about 240° C. In embodiments, the fiber-containing product may be a thermal insulation product.

Embodiments of the present technology may include still further methods of making a fiber-containing product that includes contacting fibers with a binder composition to make a fiber-binder amalgam. The binder composition may include sorbitol and a polymeric polycarboxylic acid polymer, and may have a mole ratio of hydroxyl groups to carboxylic acid groups greater than or about 1.1:1. In further embodiments, the binder composition may be free of long-chain polyols having a molecular weight greater than or about 1500 Daltons. The method may further include curing the fiber-binder amalgam at a curing temperature greater than or about 230° C. for a curing time less than or about 1 minute to form a cured binder in the fiber-containing product. In additional embodiments, the curing temperature may be less than or about 250° C. In still further embodiments, the curing binder-fiber amalgam may release volatile organic compounds in an amount less than or about 0.2 wt. % based on the weight of the binder composition. The cured binder may be characterized by less than or about 1 wt. % unpolymerized sorbitol.

In additional embodiments, the binder-fiber product made by the method may be characterized by a thermal stability of greater than or about 100 minutes at a temperature greater than or about 240° C. In still further embodiments, the fiber-containing product may include greater than or about 5 wt. % of the cured binder. In yet additional embodiments, the fiber-containing product may release VOCs in an amount less than or about 0.2 wt. % based on the weight of the cured binder. In embodiments, the fiber-containing product may be a thermal insulation product.

Such technology may provide numerous benefits over conventional fiber-containing products and methods of making them. For example, embodiments of the present technology may provide fiber-containing products characterized by low emissions of volatile organic compounds, high thermal stability at high temperatures, and high mechanical strength under hot, humid conditions over extended periods of time. Additionally, embodiments of the present technology may provide methods of making fiber-containing products having curing operations characterized by low curing temperatures and short curing times. In addition, these improved curing operations may be achieved with binder compositions that are free of conventional polymerization catalysts, neutralization-agents, and formaldehyde-containing compounds. These and other embodiments, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

Figure 1:
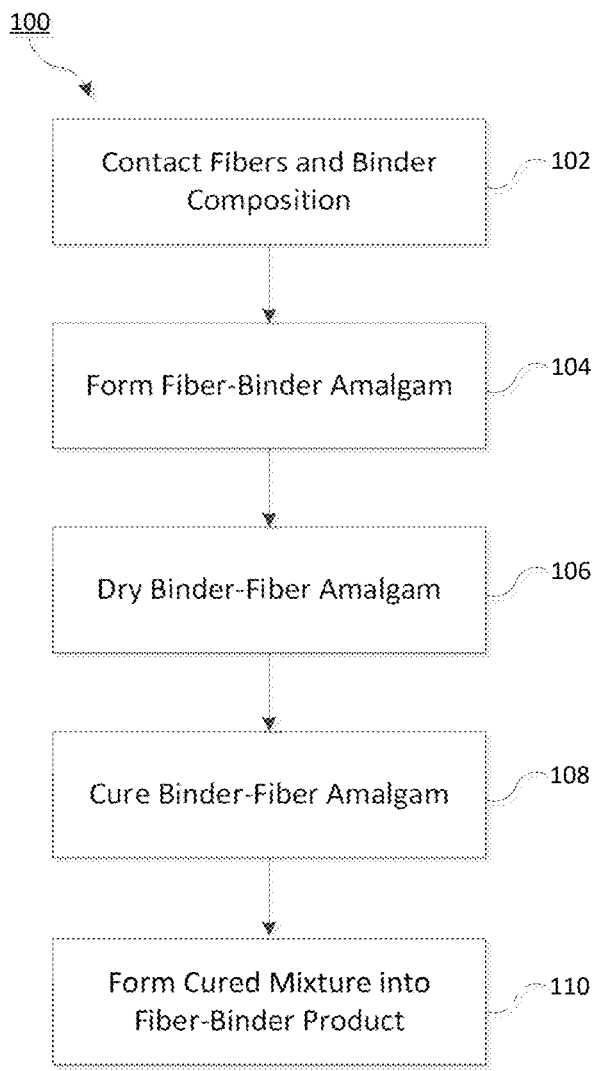
FIG. 1 shows a simplified schematic of a method of making fiber-containing products according to present embodiments.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION

Embodiments of the present technology include fiber-containing products made with binder compositions that include sugar alcohols, and methods of making the products. These fiber-containing products address several problems with conventional fiber containing products used as thermal insulation. One problem with fiber-containing insulation products made with formaldehyde-containing binder compositions is the release of formaldehyde into the air both during the curing of the binder composition and from the finished product. Embodiments of the present fiber-containing products may be made from a binder composition that is formaldehyde free. These products do not release formaldehyde during a curing operation or from the finished product.

Formaldehyde is one of many volatile organic compounds (VOCs) that may be released from a fiber-containing insulation product both during its production and in the course of its use. Post-production releases of VOCs from fiber-containing insulation products may be particularly problematic when the product insulates an article that regularly experiences high temperatures such as hot pipes, ovens, dryers, and washers, among other articles. Some conventional fiber-containing products attempt to control VOC releases by loading the binder compositions used to make the products with high molecular weight reactants. For example, conventional fiber-containing products made with binder compositions that include polyol and polycarboxylic acid reactants may be loaded with high molecular weight polyols to reduce VOC releases. These polyols may include long-chain polyols having molecular weights greater than or about 1500 Daltons such as long-chain starches and polyvinyl alcohols (PVOHs), among other long-chain polyols. Unfortunately, these long-chain polyols used in combination with long-chain polycarboxylic acids can create a number of problems in the making of a fiber-containing insulation product: the large molecules can make the conventional binder composition more viscous, which can make it more difficult to apply to the product's fibers. In many instances, one or more viscosity reducers are added to these conventional binder compositions so they may be adequately applied to the fibers. The larger organic molecules can also be more difficult to dissolve in an aqueous-based binder composition. In additional instances, a neutralization agent is added to the conventional binder composition to ionize the carboxylic acid groups on the polycarboxylic acid so that it can be adequately dissolved in an aqueous solvent. In addition, one or more surfactants may be added to the conventional binder composition to increase the dispersion of the larger organic molecules in an aqueous solvent. The larger organic molecules can also increase the cure times and temperatures of a cure operation that converts the conventional binder composition into a cured binder in the fiber-containing product. Thus, one or more catalysts may be added to the conventional binder composition to reduce one or both of the cure times and cure temperatures during the curing operation.

Embodiments of the present technology address these problems by making fiber-containing products using binder compositions that include short-chained sugar alcohols and polycarboxylic acids that give the binder composition a mole ratio of hydroxyl groups to carboxylic acid groups greater than or about 1.1:1. These binder compositions may be cured at lower curing temperatures and shorter curing times than conventional binder compositions that contain significant amounts of long-chain polyols. These binder compositions form cured binders between the fibers that are more thoroughly polymerized than conventional cured binders. In embodiments, the cured binder may be characterized by less than or about 1 wt. % unpolymerized sugar alcohol reactant. In embodiments, this high degree of polymerization in the cured binder may be achieved without the addition of one or more polymerization-enhancement agents such as a catalyst (a.k.a., cure accelerator), a neutralizer, and an initiator, among other polymerization-enhancement agents.

The cured binders in embodiments of the present fiber-containing products may enhance one or more characteristics of the product: embodiments of the present fiber-containing products may be characterized by VOC releases of less than or about 0.2 wt. %, based on the weight of the cured binder. In additional embodiments, the present fiber-containing products may be characterized by a thermal stability of greater than or about 100 minutes at a temperature greater than or about 240° C. In still further embodiments, the present fiber-containing products may be characterized as being permanently thermally stable at temperatures less than or about 230° C. This may make embodiments of the present fiber-containing products well suited as insulation for articles that experience intermittent high temperatures such as hot pipes, ovens, dryers, and washers, among other articles.

Exemplary Fiber-Containing Products

Embodiments of the present technology include fiber-containing products such as thermal insulation products. The fiber-containing products may include fibers and a cured binder. In embodiments, the fibers may exclusively consist of glass fibers. In additional embodiments, the fibers may include a blend of glass fibers with one or more other types of fibers. These other types of fibers may include carbon fibers, mineral fibers, stone wool fibers, and organic polymer fibers, among other types of fibers. In embodiments where the fibers include a blend of glass fibers and one or more other types of fibers, the glass fibers may be greater than or about 50 wt. % of the fibers, greater than or about 60 wt. % of the fibers, greater than or about 70 wt. % of the fibers, greater than or about 80 wt. % of the fibers, greater than or about 90 wt. % of the fibers, greater than or about 95 wt. % of the fibers, greater than or about 99 wt. % of the fibers, or more.

In embodiments, the cured binder in the fiber-containing product may be made from a binder composition that includes at least one sugar alcohol and at least one polycarboxylic acid. In further embodiments the sugar alcohol may be a non-reducing sugar alcohol having three of more carbon atoms, four or more carbon atoms, five or more carbon atoms, six or more carbon atoms, seven or more carbon atoms, eight or more carbon atoms, or more. In still further embodiments, the sugar alcohol may have twenty or fewer carbon atoms, fifteen or fewer carbon atoms, twelve or fewer carbon atoms, ten or fewer carbon atoms, nine or fewer carbon atoms, eight or fewer carbon atoms, seven or fewer carbon atoms six or fewer carbon atoms, five or fewer carbon atoms, or less. In yet further embodiments the sugar alcohol may include one or more sugar alcohols selected from sorbitol, mannitol, xylitol, maltitol, glycerol, erythritol, threitol, arabitol, ribitol, galactitol, fucitol, iditol, inositol, volemitol, isomalt, lactitol, maltotritol, maltotetraitol, and polyglycitol. In additional embodiments, the sugar alcohol in the binder composition may consist exclusively of sorbitol, mannitol, xylitol, maltitol, or glycerol.

In additional embodiments, the polycarboxylic acid in the present binder compositions may include a polymeric polycarboxylic acid having a molecular weight of greater than or about 1000 Daltons, greater than or about 2000 Daltons, greater than or about 3000 Daltons, greater than or about 4000 Daltons, greater than or about 5000 Daltons, or more. In still further embodiments, the polymeric polycarboxylic acid may have a molecular weight of less than or about 10,000 Daltons, less than or about 9000 Daltons, less than or about 8000 Daltons, less than or about 7000 Daltons, less than or about 6000 Daltons, less than or about 5000 Daltons, or less. In embodiments, the polymeric polycarboxylic acid may be made from unsaturated polycarboxylic acid monomers and/or oligomers. In additional embodiments, the polymeric polycarboxylic acid may be a polyacrylic acid polymer. In further embodiments, the polyacrylic acid polymer may be at least one of a polyacrylic acid homopolymer and a polyacrylic acid copolymer. In yet further embodiments, the polyacrylic acid copolymer may include a copolymer of acrylic acid and at least one or more ethylenically unsaturated acids and anhydrides such as methacrylic acid, acrylic acid, crotonic acid, fumaric acid, maleic acid, maleic anhydride, 2-methyl maleic acid, itaconic acid, itaconic anhydride, 2-methyl itaconic acid, and $\alpha,\beta$-methylene glutaric acid. In yet further embodiments, the polymeric polycarboxylic acid may be one or more of a polyacrylic acid polymer, a polyacrylic acid-maleic acid copolymer, a butane tetracarboxylic acid copolymer, and a polymaleic acid polymer. In still further embodiments, the polymeric polycarboxylic acid may comprise at least one homopolymer or copolymer selected from the group consisting of acrylic acid, maleic acid, itaconic acid, and methacrylic acid.

In embodiments, the combination of the one or more sugar alcohols and the polymeric polycarboxylic acids may give the binder composition a mole ratio of hydroxyl groups to carboxylic acid groups that is greater than or about 0.5:1, greater than or about 0.6:1, greater than or about 0.7:1, greater than or about 0.8:1, greater than or about 0.9:1, greater than or about 1.0:1, greater than or about 1.1:1, greater than or about 1.15:1, greater than or about 1.2:1, greater than or about 1.25:1, greater than or about 1.3:1, greater than or about 1.35:1, greater than or about 1.4:1, greater than or about 1.45:1, greater than or about 1.5:1, or more. As noted above, the greater number of hydroxyl (—OH) groups relative to the carboxylic acid (—COOH) groups in the binder composition imparts a number of improved characteristics to the cured binder in the fiber-containing product, including an increased thermal stability, lower releases of VOCs, shorter curing times, and lower curing temperatures, among other improved characteristics.

In further embodiments, the total amount of sugar alcohols in the binder composition (by dry weight) may be greater than or about 10 wt. %, greater than or about 15 wt. %, greater than or about 20 wt. %, greater than or about 25 wt. %, greater than or about 30 wt. %, greater than or about 35 wt. %, greater than or about 40 wt. %, greater than or about 45 wt. %, greater than or about 50 wt. %, greater than or about 55 wt. %, greater than or about 60 wt. %, greater than or about 65 wt. %, greater than or about 70 wt. %, greater than or about 75 wt. %, greater than or about 80 wt. %, greater than or about 85 wt. %, greater than or about 90 wt. %, or more. In additional embodiments, the total amount of polymeric polycarboxylic acids and other carboxylic acid-containing compounds in the binder composition (by dry weight) may be less than or about 90 wt. %, less than or about 85 wt. %, less than or about 80 wt. %, less than or about 75 wt. %, less than or about 70 wt. %, less than or about 65 wt. %, less than or about 60 wt. %, less than or about 55 wt. %, less than or about 50 wt. %, less than or about 45 wt. %, less than or about 40 wt. %, less than or about 35 wt. %, less than or about 30 wt. %, less than or about 25 wt. %, less than or about 20 wt. %, less than or about 15 wt. %, less than or about 10 wt. %, or less.

In still further embodiments, the sugar alcohols and the polymeric polycarboxylic acid compounds may represent the majority of the compounds mixed into water in an aqueous binder composition. In embodiments, the total solids level of sugar alcohols and other non-reducing sugars in the binder composition may be greater than or about 5 wt. %, greater than or about 10 wt. %, greater than or about 20 wt. %, greater than or about 30 wt. %, greater than or about 35 wt. %, greater than or about 40 wt. %, greater than or about 45 wt. %, greater than or about 50 wt. %, greater than or about 55 wt. %, greater than or about 60 wt. %, greater than or about 65 wt. %, greater than or about 70 wt. %, greater than or about 75 wt. %, or more. In additional embodiments, the total solids level of polymeric polycarboxylic acid compounds in the binder composition may be less than or about 50 wt. %, less than or about 45 wt. %, less than or about 40 wt. %, less than or about 35 wt. %, less than or about 30 wt. %, less than or about 25 wt. %, less than or about 20 wt. %, less than or about 10 wt. %, less than or about 5 wt. %, or less. In still further embodiments, the sugar alcohols and the polymeric polycarboxylic acid compounds may have a combined total solids level in the binder composition of greater than or about 5 wt. %, greater than or about 10 wt. %, greater than or about 15 wt. %, greater than or about 20 wt. %, greater than or about 25 wt. %, greater than or about 30 wt. %, greater than or about 35 wt. %, greater than or about 40 wt. %, greater than or about 45 wt. %, greater than or about 50 wt. %, greater than or about 55 wt. %, greater than or about 60 wt. %, greater than or about 70 wt. %, greater than or about 80 wt. %, greater than or about 90 wt. %, greater than or about 95 wt. %, or more.

The total solids level in the present binder compositions may influence the viscosity of the binder composition. Pure water at room temperature (~23° C.) has a viscosity of about 1 centipoise (cP), and, generally speaking, the higher the total solids level in an aqueous binder composition the higher the viscosity. In embodiments, the present binder compositions may have a room temperature viscosity greater than or about 100 cP, greater than or about 200 cP, greater than or about 300 cP, greater than or about 400 cP, greater than or about 500 cP, greater than or about 600 cP, or more. In further embodiments, the present binder compositions may have a room temperature viscosity less than or about 1000 cP, less than or about 900 cP, less than or about 800 cP, less than or about 700 cP, less then or about 600 cP, less than or about 500 cP, less than or about 400 cP, less than or about 300 cP, less than or about 200 cP, or less.

The size and reactivity of the sugar alcohols make them well suited for embodiments of the present binder compositions. In embodiments, the binder compositions may be free of organic polyols other than sugar alcohols. They may be free of one or more types of polyols such as polyvinyl alcohols, hydrolyzed polyvinyl acetates, reducing sugars, alkanol amines, starches, β-hydroxyalkylamides, and β-hydroxyamides, among other non-sugar alcohol polyols. Embodiments of the present binder compositions may be free of all polyols having a molecular weight greater than or about 1000 Daltons, greater than or about 1250 Daltons, greater than or about 1500 Daltons, greater than or about 1750 Daltons, greater than or about 2000 Daltons, or more. In still further embodiments, the polyols in the binder composition may exclusively consist of one or more sugar alcohols. In yet further embodiments, the polyols in the binder composition may exclusively consist of sorbitol.

The improved characteristics of embodiments of the present fiber-containing products may also depend on the polycarboxylic acid compounds that are combined with the sugar alcohols in the binder composition. In embodiments, the binder compositions may include one or more polymeric polycarboxylic acids and be free of one or more other types of polycarboxylic acid compounds. They may be free of monomeric polycarboxylic acids. The binder compositions may be free of one or more polycarboxylic acid compounds such as acetic acid, citric acid, adipic acid, oxalic acid, as well as salts thereof. In yet further embodiments, the polymeric polycarboxylic acid compounds in the binder composition may exclusively consist of one or more polyacrylic acid polymers.

In embodiments, the polycarboxylic acid compounds in the present binder compositions can disperse or dissolve into the aqueous solvent without the aid of a neutralization agent. In embodiments, the present binder compositions may be free of a neutralization agent. They may be free of one or more neutralization agents such as sodium hydroxide, potassium hydroxide, sodium carbonate, potassium carbonate, ammonium hydroxide, ammonia, and amines, among other types of neutralization agents.

As noted above, a mole ratio of hydroxyl groups to carboxylic acid groups in the binder composition favors the hydroxyl groups. This may give the binder composition a pH that is higher than the pH of conventional binder compositions made with polyols and polycarboxylic acids that favor the carboxylic acid groups. In embodiments, the present binder compositions may have a pH greater than or about 2, greater than or about 3, greater than or about 4, greater than or about 5, greater than or about 6, or more. In additional embodiments, the present binder compositions may have a pH less than or about 8, less than or about 7, less than or about 6, less than or about 5, less than or about 4, less than or about 3, or less. In embodiments, the present binder compositions may be free of pH adjustment agents.

The mole ratio favoring more hydroxyl groups to carboxylic acid groups in the present binder compositions can reduce curing temperatures and curing times without the addition of polymerization-enhancement agents. In embodiments, the present binder compositions may be free of a polymerization catalyst (a.k.a., cure accelerator). They may be free of one or more catalysts such as alkali metal salts of phosphorous-containing acids like phosphorous acid (e.g., sodium and potassium phosphate), hypophosphorous acid (e.g., sodium and potassium hypophosphite), and polyphosphoric acid (e.g., sodium and potassium polyphosphate), sodium and potassium pyrophosphate, sodium and potassium hexametaphosphate, sulfuric acid, p-toluenesulfonic acid, sodium sulfate, sodium nitrite, sodium carbonate, boric acid, and fluoroborate compounds, polyethyleneimine, diethylamine, and triethylamine, among other catalyst compounds.

In embodiments, the binder composition may include one or more additional compounds such as coupling agents, dust suppression agents, biocides, deodorants, antioxidants, dyes, pigments, colorants, UV stabilizers, corrosion inhibitors, lubricants, wetting agents, antistatic agents, water repelling agents, emulsifiers, anti-foaming agents, preservatives, vegetable oils, and surfactants, among other additional compounds. In further embodiments, the additional compounds may be added to the present binder compositions in an amount greater than or about 0.1 wt. % of the binder composition, greater than or about 0.5 wt. %, greater than or about 1 wt. %, greater than or about 2.5 wt. %, greater than or about 5 wt. %, greater than or about 7.5 wt. %, greater than or about 10 wt. %, or more. In yet further embodiments, the additional compounds may be added to the present binder compositions in an amount less than or about 10 wt. %, less than or about 5 wt. %, less than or about 2.5 wt. %, less than or about 1 wt. %, or less.

In further embodiments, the coupling agent in the present binder compositions may be a silicon-containing coupling agent to increase bonding between the glass fibers and the cured binder. In additional embodiments, the silicon-containing coupling agent may be a silane coupling agent. In yet additional embodiments, the silane coupling agent may be selected from aminosilanes (e.g., triethoxyaminopropylsilane, 3-aminopropyl-triethoxysilane, 3-aminopropyl-trihydroxysilane, γ-aminopropyltriethoxysilane), epoxy trialkoxysilanes (e.g., 3-glycidoxypropyltrimethoxysilane, 3-glycidoxypropyltriethoxysilane), methyacryl trialkoxysilanes (e.g., 3-methacryloxypropyltrimethoxysilane, 3-methacryloxypropyltriethoxysilane), hydrocarbon trialkoxysilanes, amino trihydroxysilanes, epoxy trihydroxysilanes, methacryl trihydroxy silanes, and hydrocarbon trihydroxysilanes.

In some embodiments, the present binder compositions may exclusively consist of water, one or more sugar alcohols, one or more polymeric polycarboxylic acids, and a coupling agent. In additional embodiments, the coupling agent may be applied to the fibers through a sizing composition for the fibers, and the binder compositions may exclusively consist of water, one or more sugar alcohols, and one or more polymeric polycarboxylic acids.

In embodiments of the present technology, the fiber-containing product may be made from an amalgam of the fibers and the binder composition that is cured to form the product. In further embodiments, the amount of cured binder in the fiber-containing product may be greater than or about 5 wt. % of the fiber-containing product, greater than or about 10 wt. %, greater than or about 15 wt. %, greater than or about 20 wt. %, or more. In still further embodiments, the amount of cured binder in the fiber-containing product may be less than or about 30 wt. %, less than or about 25 wt. %, less than or about 20 wt. %, less than or about 15 wt. %, less than or about 10 wt. %, less than or about 5 wt. %, or less. The amount of cured binder in the fiber-containing product may be measured as a loss on ignition (LOI) from the fiber-containing product.

As noted above, embodiments of the present fiber-containing products may produce fewer volatile organic compounds (VOCs) than products made with conventional polyol-and-polycarboxylic acid binder compositions. This can make embodiments of the present products well suited as thermal insulation for articles that experience high temperatures such as hot pipes, ovens, dryers, and dishwashers, among other articles. In embodiments, the fiber-containing product heated to a temperature between 100° C. and 200° C. for a time of up to 100 minutes may release VOCs in an amount less than or about 5 wt. % (based on the weight of the cured binder in the fiber-containing product), less than or about 2.5 wt. %, less than or about 1 wt. %, less than or about 0.5 wt. %, less than or about 0.2 wt. %, less than or about 0.1 wt. %, or less. In still additional embodiments, the binder composition and cured binder are formaldehyde free, so the released VOCs are also formaldehyde-free.

In some embodiments, the low levels of VOCs released from the present fiber-containing products may be correlated with the products' thermal stability. In further embodiments, the thermal stability of the product may be correlated with the thermal stability of the cured binder in the product. The cured binder's thermal stability may be measured as a function of the heat released from the binder over time at a particular temperature. As described below, exotherm data may be collected from cured binders by measuring the amount of heat released over a period of time as the binder is kept at a fixed temperature. In some embodiments, the exotherm data shows a peak heat release time that may be correlated to a time when the binder becomes thermally unstable and undergoes uncontrolled combustion in an oxygen-containing atmosphere (e.g., air). A binder that reaches peak heat release earlier in time may be characterized as less thermally stable than a binder reaching peak heat release later in time. In some embodiments, the exotherm data does not show a peak heat release over the time recorded for the binder at that temperature. In those embodiments, the binder may be permanently thermally stable at that temperature.

In embodiments of the present cured binders, the binders may be thermally stable for a time greater than or about 100 minutes at temperatures greater than or about 230° C. In further embodiments, the binders may be thermally stable for a time greater than or about 100 minutes at temperatures greater than or about 235° C., greater than or about 240° C., greater than or about 250° C., greater than or about 260° C., greater than or about 270° C., or more. In further embodiments, the present cured binders in the fiber-containing products may exhibit permanent thermal stability, as shown by a plot of exotherm data, for temperatures less than or about 250° C., less than or about 245° C., less than or about 240° C., less than or about 235° C., less than or about 230° C., less than or about 225° C., less than or about 220° C., or less.

In further embodiments, the increased thermal stability of the cured binder may be accompanied by increased mechanical strength of the fiber-containing product. In embodiments, the fiber-containing products may have unaged tensile strength of greater than or about 3 megapascals (MPa), greater than or about 3.25 MPa, greater than or about 3.5 MPa, greater than or about 3.75 MPa, greater than or about 4 MPa, greater than or about 4.25 MPa, greater than or about 4.5 MPa, greater than or about 4.75 MPa, greater than or about 5 MPa, or more. In additional embodiments, the fiber-containing products may have a humid-aged tensile strength of greater than or about 1.5 MPa, greater than or about 1.75 MPa, greater than or about 2 MPa, greater than or about 2.25 MPa, greater than or about 2.5 MPa, greater than or about 2.75 MPa, greater than or about 3 MPa, or more. In yet additional embodiments, the cured binders in the fiber-containing products may be characterized by a humid-aged retention greater than or about 35%, greater than or about 40%, greater than or about 45%, greater than or about 50%, greater than or about 55%, greater than or about 60%, greater than or about 65%, greater than or about 70%, greater than or about 75%, or more.

Embodiments of the fiber-containing products that include cured binders made with the present binder compositions have several improved thermal and mechanical characteristics compared with fiber-containing products made with conventional polyol-polycarboxylic acid binder compositions. These improved characteristics include increased thermal stability, lower releases of VOCs at high temperatures, and increased tensile strength under humid-aged conditions. These improved characteristics may be attributed at least in part to the selection and relative amounts of the sugar alcohols and polymeric polycarboxylic acids in the binder composition. As noted above, the selection of smaller-sized sugar alcohols and polymeric polycarboxylic acids may reduce the binder composition's viscosity, increase its dispersion and/or solubility in water, and increase the completeness of polymerization reactions between the reactants in shorter curing times and lower curing temperatures. The relative amounts of sugar alcohols and polymeric polycarboxylic acids may also be selected to give the binder composition a mole ratio of hydroxyl groups to carboxylic acid groups that is greater than or about 1.1:1. It has been found that this mole ratio range favoring the number hydroxyl groups over the number of carboxylic acid groups also improves the above-described characteristics in the cured binders of the fiber-containing products.

Exemplary Methods of Making the Fiber-Containing Products

Embodiments of the present technology includes methods of making a fiber-containing product that includes a cured binder made from a binder composition having a sugar alcohol and a polymeric polycarboxylic acid. As noted above, the types and relative amounts of the sugar alcohol and polymeric polycarboxylic acid may be selected to cure the binder composition in shorter curing times and lower curing temperatures than conventional binder compositions. In embodiments, the present binder compositions can achieve these improved curing conditions without adding conventional polymerization agents to the compositions.

FIG. 1 shows a flowchart that highlights some of the operations in a method 100 of making a fiber-containing product according to embodiments. The method 100 includes contacting fibers with a binder composition at operation 102. In some embodiments, the binder composition may contact the fibers by one or more application operations such as spraying the binder composition on the fibers, curtain coating, spin-curtain coating, and dip-roll coating, among other application operations. The binder composition may contact freshly formed fibers that are above room temperature, or fibers that have cooled and been processed by, for example, cutting, pressing, and/or sizing, among other types of processing. In embodiments, the binder composition may be applied to fibers before they are organized into a mat or batt, while in additional embodiments the binder composition may be applied to the fibers after they are organized into a mat or batt.

The method 100 may further include forming the combination of fibers and binder composition into a fiber-binder amalgam at operation 104. In embodiments, the fiber-binder amalgam may be formed by placing the binder-coated fibers on a conveyor belt where they form a mat or batt of the amalgam. In additional embodiments, the fiber-binder amalgam is formed when the binder composition is applied to a mat or batt of the uncoated fibers that sit on a conveyor belt.

In embodiments, method 100 may also include a drying operation 106 that removes some of the water from the binder composition in the fiber-binder amalgam. In some embodiments, the drying operation 106 may include blowing a gas onto or through the fiber-binder amalgam. In embodiments, the gas may be heated to a temperature greater than or about 30° C., greater than or about 40° C., greater than or about 50° C., greater than or about 60° C., greater than or about 70° C., greater than or about 80° C., greater than or about 90° C., or more. In further embodiments, the gas may be air. In yet further embodiments, the fiber-binder amalgam may sit on a conveyor belt that is made of an air permeable material such as a wire screen or perforated belt that permits gases to pass through the belt. In still additional embodiments, the drying gas may be blown down on the fiber-binder amalgam from above, or it may be blown up through the fiber-binder amalgam from below.

The method 100 may still further include curing the fiber-binder amalgam in a curing operation 108. In embodiments, the curing operation 108 may be conducted by transporting the fiber-binder amalgam to a curing oven to raise the amalgam to a curing temperature for a curing time. In further embodiments, the curing oven may heat the fiber-binder amalgam to a curing temperature that is greater than or about 200° C., greater than or about 210° C., greater than or about 220° C., greater than or about 225° C., greater than or about 230° C., greater than or about 235° C., greater than or about 240° C., greater than or about 245° C., greater than or about 250° C., greater than or about 255° C., greater than or about 260° C., greater than or about 265° C., greater than or about 270° C., or more. In additional embodiments, the curing oven may heat the fiber-binder amalgam to a curing temperature that is less than or about 270° C., less than or about 260° C., less than or about 250° C., less than or about 245° C., less than or about 240° C., less than or about 235° C., less than or about 230° C., less than or about 225° C., less than or about 220° C., or less. In still further embodiments, the curing oven may heat the curing binder-fiber amalgam for a curing time that is less than or about 30 minutes, less than or about 25 minutes, less than or about 20 minutes, less than or about 15 minutes, less than or about minutes, less than or about 7.5 minutes, less than or about 5 minutes, less than or about 2.5 minutes, less than or about 1 minute, less than or about 0.5 minutes, or less.

In embodiments, the fiber-binder amalgams made with the present binder compositions that include a sugar alcohol reactant may cure in less time at a particular cure temperature than comparable fiber-binder amalgams made with binder compositions that lack a sugar alcohol. In embodiments, the binder-fiber amalgams with the sugar-alcohol-containing binder compositions may have cure times that are greater than or about 5 minutes less at the cure temperature than the comparable fiber-binder amalgams that lack a sugar-alcohol. In further embodiments, the binder-fiber amalgams with the sugar-alcohol-containing binder compositions may cure in greater than 10 minutes shorter, greater than 15 minutes shorter, greater than 20 minutes shorter, or more, than the comparable fiber-binder amalgams. In yet further embodiments, the present fiber-binder amalgams made with sugar-alcohol-containing binder compositions may be characterized by peak cure temperatures that are less than a peak cure temperature of a comparable binder-fiber amalgam that lacks a sugar alcohol in the binder composition. In embodiments, the peak cure temperature of the present binder-fiber amalgam may be 5° C. less, 10° C. less, 15° C. less, 20° C. less, 25° C. less, 30° C. less, or less than the peak cure temperature of a comparable binder-fiber amalgam that lacks a sugar alcohol.

As noted above, embodiments of the present binder compositions may be cured with the release of fewer volatile organic compounds (VOCs) than conventional polyol-and-polycarboxylic acid-containing binder compositions. In embodiments, the amount of VOCs released from the curing binder composition in the fiber-binder amalgam may be less than or about 5 wt. % of the binder composition, less than or about 2.5 wt. %, less than or about 1 wt. %, less than or about 0.5 wt. %, less than or about 0.2 wt. %, less than or about 0.1 wt. %, less than or about 0.05 wt. %, less than or about 0.01 wt. %, or less. In further embodiments, the released VOCs may be formaldehyde free.

The cured binder formed by curing operation 108 may be polymerized to a greater extent than a conventional polyol-and-polycarboxylic acid binder that is exposed to the same curing conditions. In embodiments, the cured binder in the fiber-containing product may include less than or about 5 wt. % of unpolymerized sugar alcohol based on the weight of the cured binder. In additional embodiments, the amount of unpolymerized sugar alcohol in the cured binder may be less than or about 4 wt. %, less than or about 3 wt. %, less than or about 2 wt. %, less than or about 1 wt. %, less than or about 0.5 wt. %, less than or about 0.1 wt. %, or less. In still further embodiments, the amount of polymeric polycarboxylic acid that has not reacted with sugar alcohols in the cured binder may be less than or about 5 wt. % of the cured binder, less than or about 4 wt. %, less than or about 3 wt. %, less than or about 2 wt. %, less than or about 1 wt. %, less than or about 0.5 wt. %, less than or about 0.1 wt. %, or less. As noted above, these high rates of polymerization of the sugar alcohol and polymeric polycarboxylic acid reactants may be achieved with embodiments of the binder composition that is free of polymerization catalysts, polymerization initiators, and other polymerization-enhancement agents.

In further embodiments, the extent of polymerization in the cured binder may be characterized by the mole ratio of free acid groups (i.e., free-COOH groups) to ester groups formed by the reaction of the acid groups of the polymeric polycarboxylic acid with the hydroxyl groups of the sugar alcohol. In embodiments, the cured binder may be characterized by a mole ratio of acid groups to ester groups that may be less than or about 1:1, less than or about 1:2, less than or about 1:3, less than or about 1:4, less than or about 1:5, less than or about 1:6, less than or about 1:7, less than or about 1:8, less than or about 1:9, less than or about 1:10, or less.

In embodiments, the binder curing conditions and the extent of polymerization in the cured binder may affect the moisture levels and amounts of water-soluble materials in the cured binder. In further embodiments, the cured binder in the fiber-containing product may be characterized by low moisture levels and low amounts of water-soluble materials. In still additional embodiments, the cured binder may be characterized by moisture levels less than or about 10 wt. % based on the weight of the cured binder, less than or about 5 wt. %, less than or about 2.5 wt. %, less than or about 1 wt. %, less than or about 0.5 wt. %, less than or about 0.1 wt. %, or less. In still further embodiments, the cured binder may be characterized as having water soluble materials in amounts less than or about 5 wt. %, less than or about 4 wt. %, less than or about 3 wt. %, less than or about 2 wt. %, less than or about 1 wt. %, less than or about 0.5 wt. %, or less.

In additional embodiments, the moisture levels and amounts of water-soluble materials in the cured binder may contribute to the water resistance of the cured binder and fiber-containing product. This water resistance may be characterized by the amount of water absorbed by the cured binder. In embodiments, the cured binder may absorb less than or about 1 wt. % water based on the weight of the cured binder. In additional embodiments, the amount of water absorbed by the cured binder may be less than or about 0.9 wt. %, less than or about 0.8 wt. %, less than or about 0.7 wt. %, less than or about 0.6 wt. %, less than or about 0.5 wt. %, less than or about 0.4 wt. %, less than or about 0.3 wt. %, less than or about 0.2 wt. %, or less.

The method 100 may yet further include one or more finishing operations 110 that form the mixture or fibers and cured binder into the fiber-containing product. In embodiments, these finishing operations 110 may include shaping the mixture of fibers and cured binder, compacting the mixture, adding a facer to the mixture, and packaging the mixture, among other finishing operations.

Figure 2A:
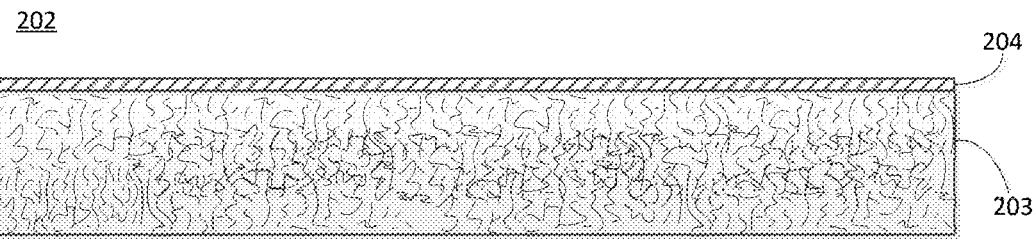
FIGS. 2A-C show embodiments of the present fiber-containing products.
Figure 2B:
Figure 2C:
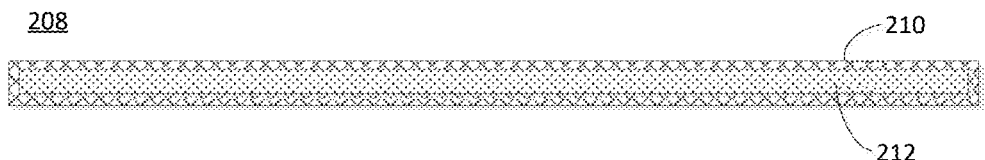

Embodiments of method 100 may produce fiber-containing products like the ones shown in FIGS. 2A-C. FIG. 2A shows a simplified schematic of an insulation batt material 202 according to an embodiment of the present fiber-containing products. In embodiments, the insulation batt material 202 may include non-woven fibers held together by the cured binder. The fibers may be glass fibers used to make fiberglass insulation (e.g, low-density or high-density fiberglass insulation), or a blend of two or more types of fibers, such as a blend of glass fibers and organic polymer fibers, among other types of fibers. In additional embodiments, a facer 204 may be attached to one or more surfaces of the batt 203. In further embodiments, the batt 203 may have a thickness greater than or about 1 cm, greater than or about 5 cm, greater than or about 10 cm, greater than or about 20 cm, greater than or about 30 cm, greater than or about 40 cm, or more. In additional embodiments, the batt 203 may have a thickness less than or about 40 cm, less than or about 30 cm, less than or about 20 cm, less than or about 10 cm, or less.

FIG. 2B is a simplified schematic of a fiber-containing composite board 206 that may be used as an insulation board, duct board, elevated temperature board, etc. according to embodiments of the present fiber-containing product. In embodiments, the fibers in board 206 may include glass fibers, organic polymer fibers, carbon fibers, mineral fibers, metal fibers, among other types of fibers, and blends of two or more types of fibers.

FIG. 2C is a simplified schematic of a fiber-containing flexible insulation material 208 that may be used as a wrap and/or liner for ducts, pipes, tanks, equipment, etc., according to embodiments of the present fiber-containing product. In embodiments, the fiber-containing flexible insulation material 208 may include a facer 210 attached to one or more surfaces of the fiber material 212. In further embodimenst, materials for the facer 210 may include fire-resistant foil-scrim-kraft facing.

Additional embodiments of the fiber-containing products may include low-density fiberglass insulation batt (e.g. less than about 0.5 lbs/ft$^3$) and high-density fiberglass insulation batt. Further embodiments may include piping insulation, duct boards, duct liner, duct wrap, flexible duct media, pipe insulation, tank insulation, rigid plenum liner, textile duct liner insulation, equipment liner, oven insulation, elevated temperature board, elevated temperature wrap, elevated temperature panel, insulation rolls, exterior foundation insulation board, and marine hull insulation.

In still further embodiments, the fiber-containing products may include construction materials including piping insulation, duct boards (e.g. air duct boards), and building insulation, reinforcement scrim, and roofing membranes, among other construction materials. Additional embodiments may include loose-fill blown insulation, duct liner, duct wrap, flexible duct media, pipe insulation, tank insulation, rigid plenum liner, textile duct liner insulation, equipment liner, oven insulation, elevated temperature board, elevated temperature wrap, elevated temperature panel, insulation batts and rolls, heavy density batt insulation, light density batt insulation, exterior foundation insulation board, and marine hull insulation, among other materials.

In embodiments, the fiber-containing products may include thermal insulation product characterized by an ordinary (i.e. unweathered) parting strength of greater than or about 120 g/g, greater than or about 130 g/g, greater than or about 140 g/g, greater than or about 150 g/g, greater than or about 200 g/g, greater than or about 300 g/g, greater than or about 400 g/g, or more. In further embodiments, the thermal insulation product may be characterized by a weathered parting strength of greater than or about 120 g/g, great than or about 30 g/g, greater than or about 140 g/g, greater than or about 150 g/g, greater than or about 160 g/g, greater than or about 170 g/g, greater than or about 180 g/g, greater than or about 190 g/g, greater than or about 200 g/g, or more. In embodiments, the weathered parting strength may be measured after fiber-containing composite has been subjected to elevated temperature (e.g. about 120° F. or more) and humidity (e.g. about 95% or more relative humidity) for a period of time (e.g. about 7 days, about 14 days, etc.).

In still further embodiments, the fiber-containing products may be characterized by a density of greater than or about 5 kg/m$^3$, greater than or about 10 kg/m$^3$, greater than or about 20 kg/m$^3$, greater than or about 30 kg/m$^3$, greater than or about 40 kg/m$^3$, greater than or about 50 kg/m$^3$, greater than or about 60 kg/m$^3$, greater than or about 70 kg/m$^3$, greater than or about 80 kg/m$^3$, greater than or about 90 kg/m$^3$, greater than or about 100 kg/m$^3$, or more. In yet further embodiments, the fiber-containing product may be thermal insulation batt characterized by a density greater than or about 2.5 kg/m$^3$, greater than or about 3 kg/m$^3$, greater than or about 3.5 kg/m$^3$, greater than or about 4 kg/m$^3$, greater than or about 4.5 kg/m$^3$, greater than or about 5 kg/m$^3$, greater than or about 6 kg/m$^3$, greater than or about 7 kg/m$^3$, greater than or about 8 kg/m$^3$, greater than or about 9 kg/m$^3$, greater than or about 10 kg/m$^3$, greater than or about 11 kg/m$^3$, greater than or about 12 kg/m$^3$, or more. In additional embodiments, the fiber-containing product may be a composite is duct board characterized by a density greater than or about 30 kg/m$^3$, greater than or about 40 kg/m$^3$, greater than or about 50 kg/m$^3$, greater than or about 60 kg/m$^3$, greater than or about 70 kg/m$^3$, greater than or about 80 kg/m$^3$, greater than or about 90 kg/m$^3$, greater than or about 100 kg/m$^3$, or more.

In additional embodiments, the fiber-containing products may be characterized by a thermal conductivity, 2, of less than or about 0.05 W/mK, less than or about 0.04 W/mK, less than or about 0.03 W/mK, less than or about 0.02 W/mK, less than or about 0.01 W/mK, or less. In still further embodiments, the fiber-containing products may be thermal insulation batts characterized by an ordinary (i.e., unweathered) rigidity, as measured by droop level, of less than or about 3 inches, less than or about 2.5 inches, less than or about 2 inches, or less. In further embodiments, the thermal insulation batts may be characterized by a weathered droop level of less than or about 6 inches, less than or about 5 inches, less than or about 4 inches, less than or about 3 inches, or less. In additional embodiments, the thermal insulation may be characterized by an ordinary recovery level after compression of greater than or about 5 inches, greater than or about 6 inches, greater than or about 7 inches, greater than or about 8 inches, or more. In further embodiments, the thermal insulation may be characterized by a weathered recovery level after compression of greater than or about 5 inches, greater than or about 6 inches, or more.

Exemplary Systems of Making the Fiber-Containing Products

Figure 3:
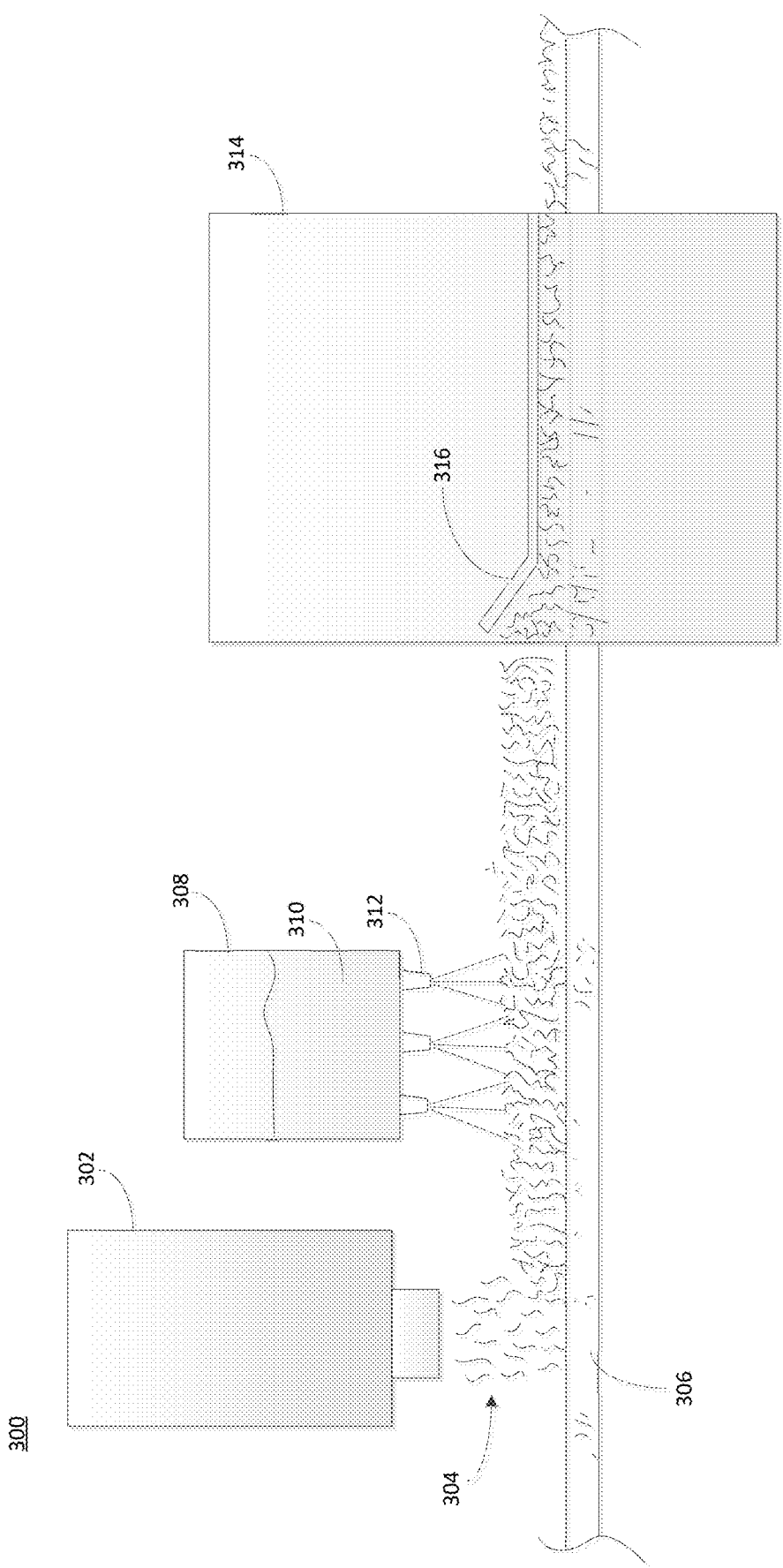
FIG. 3 shows an embodiment of a system to make the present fiber-containing materials.

FIG. 3 shows an embodiment of a system 300 for making the present fiber-containing products. In embodiments, the system 300 may include a fiber supply unit 302 that supplies the fibers for the fiber-containing product. The fiber supply unit 302 may be filled with pre-made fibers, or may include equipment for making the fibers from starting materials such as molten glass or organic polymers. The fiber supply unit 302 may deposit the fibers 304 onto a porous conveyor belt 306 that transports the fibers under the binder supply unit 308.

In embodiments, the binder supply unit 308 contains a liquid uncured binder composition 310, that may be deposited onto the fibers 304. In the embodiment shown, the binder composition 310 may be spray coated onto the fibers 304 with spray nozzles 312. In additional embodiments, other application techniques (e.g. curtain coating, dip coating, knife coating, etc.) may be used in addition to (or in lieu of) the spray coating technique illustrated by nozzles 312.

In additional embodiments, the binder composition 310 may be applied on fibers 304 to forms a fiber-binder amalgam on the top surface of the conveyor belt 306. The belt 306 may be perforated and/or porous to allow excess binder composition 310 to pass through the belt 306 to a collection unit (not shown) below. The collection unit may include filters and circulation pumps to recycle at least a portion of the excess binder back to the binder supply unit 308.

In further embodiments, the conveyor belt 306 may transport the fiber-binder amalgam to an oven 314 where it is heated to a curing temperature and the binder composition starts to cure. The temperature of the oven 314 and the speed of the conveyor belt 306 can be adjusted to control the curing time and temperature of the fiber-binder amalgam. In some embodiments, process conditions may set to completely cure the fiber-binder amalgam. In additional embodiments, process conditions may be set to partially cure the binder-fiber amalgam into a B-staged fiber-containing product.

In still further embodiments, the fiber-binder amalgam may be compressed prior to or during the curing stage. The system 300 shows an fiber-binder amalgam being compressed by passing under a plate 316 that tapers downward to decrease the vertical space available to the curing amalgam. The fiber-binder amalgam emerges from under the plate 316 in a compressed state and has less thickness than when it first made contact with the plate. In embodiments, the taper angle formed between the plate 316 and conveyor belt 306 can be adjusted to adjust the level of compression placed on the fiber-binder amalgam. In the embodiment shown, a fiber-containing product that emerges from under plate 316 can be used for a variety of applications, including construction materials such as pipe, duct, and/or wall insulation, among other applications.

Figure 4:
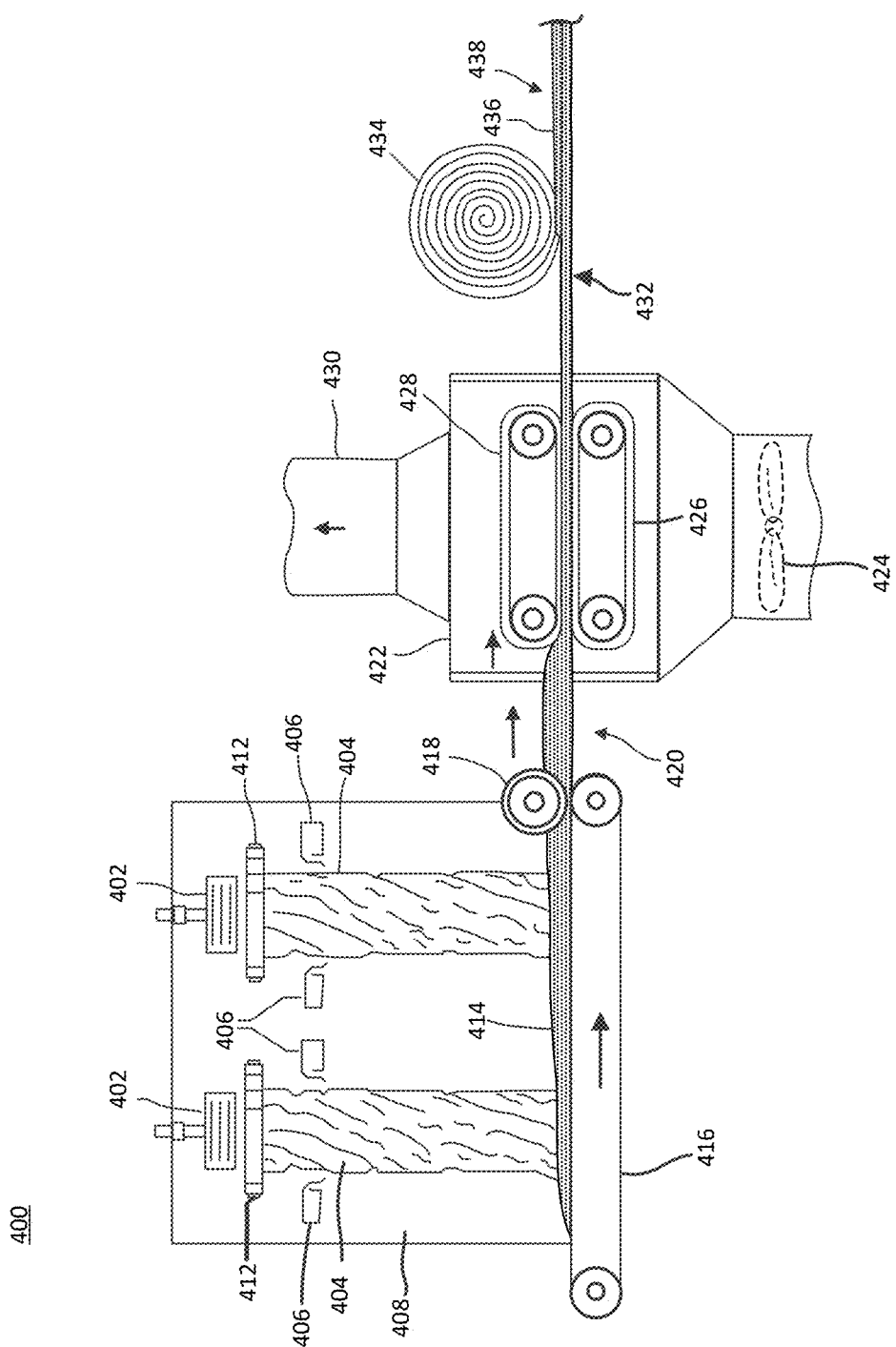
FIG. 4 shows another embodiment of a system to make the present fiber-containing materials.

FIG. 4 shows another embodiment of a system 400 for making the present fiber-containing products. The system 400 may include spinners 402 that can be rotated at high speeds to pass molten glass through holes in the circumferential sidewalls of the spinners to form glass fibers. In embodiments, the molten glass may be supplied from a heated tank (not shown) that holds the molten glass. In further embodiments, glass fibers 404 may be emerge from the fiberizing spinners 402 and may be blown in a substantially downward direction. In further embodiments, the glass fibers may be blown in a substantially perpendicular direction to the plane of the spinners 402, by blowers 406 positioned within a forming chamber 408. In additional embodiments, the glass fibers 404 may be made from a single type of glass, while in still further embodiments, they may be made from two or more different types of glass. In yet additional embodiments, glass fibers 404 may include hybrid glass fibers where each individual hybrid fiber may be formed of two or more different glass compositions.

In embodiments, the glass fibers 404 may be contacted with the binder composition while in the forming chamber 408 and while still hot from the glass fiber formation operation. In additional embodiments, the binder composition may be sprayed on the glass fibers 404 with an annular spraying rings 412. In further embodiments, the annular spraying ring 412 may provide a substantially uniform coating of the binder composition on the glass fibers 404. In still further embodiments, the glass fibers 404 coated with the binder composition may be formed into a batt of fiber-binder amalgam 414 that have a substantially uniform distribution of the binder composition throughout. In some embodiments, water may be applied to the glass fiber 404 prior to the application of the binder composition to cool the fibers.

In further embodiments, the glass fibers 404 coated with the binder composition may be gathered and formed into an uncured fiber-binder amalgam 414 on an endless forming conveyor belt 416 within the forming chamber 408. In still further embodiments, the forming chamber may pull a vacuum from below the conveyor belt 416 that puts pressure on the fiber-binder amalgam 414 from above the conveyor belt. In yet further embodiments, the residual heat from the glass fibers 404 and the flow of air through the fiber-binder amalgam 414 during the forming operation may volatilize water from the fiber-binder amalgam 414 before it exits the forming chamber 408. In embodiments, the binder composition in the fiber-binder amalgam 414 exiting the forming chamber 408 may have a lower moisture level than the binder composition applied to the glass fibers 404. These lower moisture levels may give the binder composition in the fiber-binder amalgam 414 exiting the chamber a higher viscosity than the fiber-binder amalgam 414 initially formed on the conveyor belt 416.

In yet further embodiments, the fiber-binder amalgam 414 may be compressed while exiting the forming chamber 408 by roller 418. In embodiments, the compressed fiber-binder amalgam 414 may be moved to a transfer zone 420 where the amalgam expands due to the resiliency of the glass fibers. In additional embodiments, the expanded fiber-binder amalgam 414 may be transferred to a curing oven 422 where the amalgam may be heated to a curing temperature for a curing time. In embodiments, the curing oven 422 may both dry and heat the fiber-binder amalgam 414 by blowing heated gas through the amalgam. In further embodiments, heated air may be forced though & fan 424 positioned below a lower oven conveyor 426 to dry and heat the fiber-binder amalgam 414 into a mixture of the glass fibers and curing binder. In still further embodiments, the forced heated air may continue through an upper oven conveyor 428 and out of the curing oven 422 through an exhaust conduit 430.

In still further embodiments, the upper and lower conveyors 426 and 428 may compress the curing fiber-binder amalgam 414 to a preset thickness as it is being conveyed though the curing oven 422. In embodiments, a cured and compressed mixture of the glass fibers and cured binder 432 may emerge from the curing oven 422.

In embodiments, the curing oven may be operated at temperatures greater than or about 200° C. or more, greater than or about 210° C. or more, greater than or about 220° C. or more, greater than or about 230° C., greater than or about 235° C., greater than or about 240° C., greater than or about 245° C., greater than or about 250° C., greater than or about 255° C., greater than or about 260° C., greater than or about 265° C., greater than or about 270° C., greater than or about 275° C., greater than or about 280° C., or more. In further embodiments, the speed of conveyor belt 416 and upper and lower conveyors 426 and 428 may be set to move the fiber-binder amalgam 414 through the curing oven 422 in a preset time. In still further embodiments, the curing fiber-binder amalgam 414 may reside in the curing oven for less than or about 30 minutes, less than or about 25 minutes, less than or about 20 minutes, less than or about 15 minutes, less than or about 10 minutes, less than or about 7.5 minutes, less than or about 5 minutes, less than or about 2.5 minutes, less than or about 1 minute, less than or about 0.5 minutes, or less.

In some embodiments, a facing material 434 may be placed on the mixture of glass fibers and cured binder 432 to form a facing layer 436 on the material. In additional embodiments, the combination of the facing layer 436 on the mixture of glass fibers and cured binder 432 may form a fiber-containing product 438. Some non-limiting examples of suitable facing materials 434 may include Kraft paper, a foil-scrim-Kraft paper laminate, recycled paper, and calendared paper. The facing material 434 may be adhered to the surface of the mixture of glass fibers and cured binder 432 by a bonding agent (not shown) to form the fiber-containing product 438. Suitable bonding agents include adhesives, polymeric resins, asphalt, and bituminous materials that can be coated or otherwise applied to the facing material 434. In embodiments, the fiber-containing product 438 may subsequently be rolled for storage and/or shipment or cut into predetermined lengths by a cutting device (not illustrated). Such fiber-containing products 438 may be used, for example, as ductwrap, ductboard, as faced equipment insulation, and as pipe insulation, among other applications. In some embodiments, the mixture of glass fibers and cured binder 432 that emerges from the curing oven 422 may be rolled onto a take-up roll or cut into sections having a desired length instead of being faced with a facing material 434. In still further embodiments, the mixture of glass fibers and cured binder 432 may be slit into layers and by a slitting device and then cut to a desired length (not illustrated).

EXAMPLES

Thermal stability measurements were conducted on fiberglass insulation samples made with a variety of polyol-and-polymeric-polycarboxylic acid binder compositions. The thermal stability measurements were conducted by measuring the temperatures of fiberglass insulation samples over time after they were placed in an oven. The most thermally stable samples produced exotherm plots that showed the sample climbing to the oven temperature and remaining there for the duration of the measurement time. Less thermally stable samples showed a peak in the exotherm plot well above the oven temperature that indicated the sample had undergone thermal breakdown and the combustion of the cured binder. When the cured binder had completely combusted, the burned sample consisting of the glass fibers fell back down towards the oven temperature. Based on these exotherm plots of the temperatures of the fiberglass insulation samples over time, the thermal stability of each sample could be quantified as the amount of elapsed time before a exothermic temperature peak was observed at a particular oven temperature. For example, a fiberglass insulation sample that shows an exothermic temperature peak on an exotherm plot after 30 minutes is less thermally stable than a sample that shows a exothermic temperature peak in 60 minutes.

The thermal stability measurement were conducted on fiberglass insulation Samples 1-13. Each sample was prepared as an R-19 insulation batt with a 7 inch thickness. The cured binder in each sample was characterized by a Loss-On-Ignition (LOI) of about 5 wt. % to 5.5 wt. %, based on the total weight of the sample. A thermocouple to measure the sample's temperature was placed in the center of the sample and surrounded by a high-LOI region where the cured binder was characterized by an LOI of about 40 wt. %. Each sample was put under a compressive force in the oven of about 2.8 pounds-per-cubic-foot (pcf) during the measurement period. The binder compositions used to make Samples 1-17 are listed below in Table 1.

TABLE 1

Binder Compositions for Fiberglass Insulation Samples 1-17

| Sample Number | Polyol | Polycarboxylic Acid (PCA) | Polyol/PCA Weight Ratio | Total Soilds (wt. %) |
| --- | --- | --- | --- | --- |
| 1 | Sorbitol | PAA | 40:60 | 52 wt. % |
| 2 | High-Fructose Corn Syrup (HFCS) | PAA | 43:57 | 52 wt. % |
| 3 | Sorbitol | PAA | 40:60 | 52 wt. % |
| 4 | Triethanol Amine (TEA) | PAA | 26:74 | 59 wt. % |
| 5 | Sorbitol | PAA | 40:60 | 52 wt. % |
| 6 | Polyvinyl Alcohol (PVOH) | PAA | 23:77 | 52 wt. % |
| 7 | Sorbitol | PAA | 40:60 | 52 wt. % |
| 8 | Sorbitol | PAA | 26:74 | 52 wt. % |
| 9 | Sorbitol | HPMA | 44:56 | 52 wt. % |
| 10 | Sorbitol | PAA | 40:60 | 52 wt. % |
| 11 | Sorbitol | PAMA | 33:67 | 52 wt. % |
| 12 | Sorbitol | BTCA | 44:56 | 52 wt. % |
| 13 | Sorbitol | PAA | 40:60 | 52 wt. % |
| 14 | Mannitol | PAA | 40:60 | 52 wt. % |
| 15 | Xylitol | PAA | 39:61 | 52 wt. % |
| 16 | Maltitol | PAA | 44:56 | 52 wt. % |
| 17 | Glycerol | PAA | 39:61 | 52 wt. % |

PAA = Polyacrylic Acid Polymer (MW = 4500 g/mol)
HPMA = Polymaleic Acid Polymer
PAMA = Polyacrylic-Maleic-Acid Copolymer
BTCA = Butane Tetracarboxylic Acid The aqueous binder compositions used to make fiberglass insulation Samples 1-13 consisted of the polyol, the polycarboxylic acid, and water. The relative amounts of polyol-to-polycarboxylic acid were chosen to give the binder composition a OH: COOH mole ratio of 1.5:1. After the binder compositions were applied to the glass fibers to form a fiber-binder amalgam, the amalgam was dried and heat cured in a curing oven for 10 minutes at 230° C. (446° F.) to make the fiber-containing thermal insulation products of Sample 1-13. The samples were used in Experiments 1-4 discussed below to characterize thermal stability in embodiments of fiber-containing products.

Experiment 1

Figure 5:
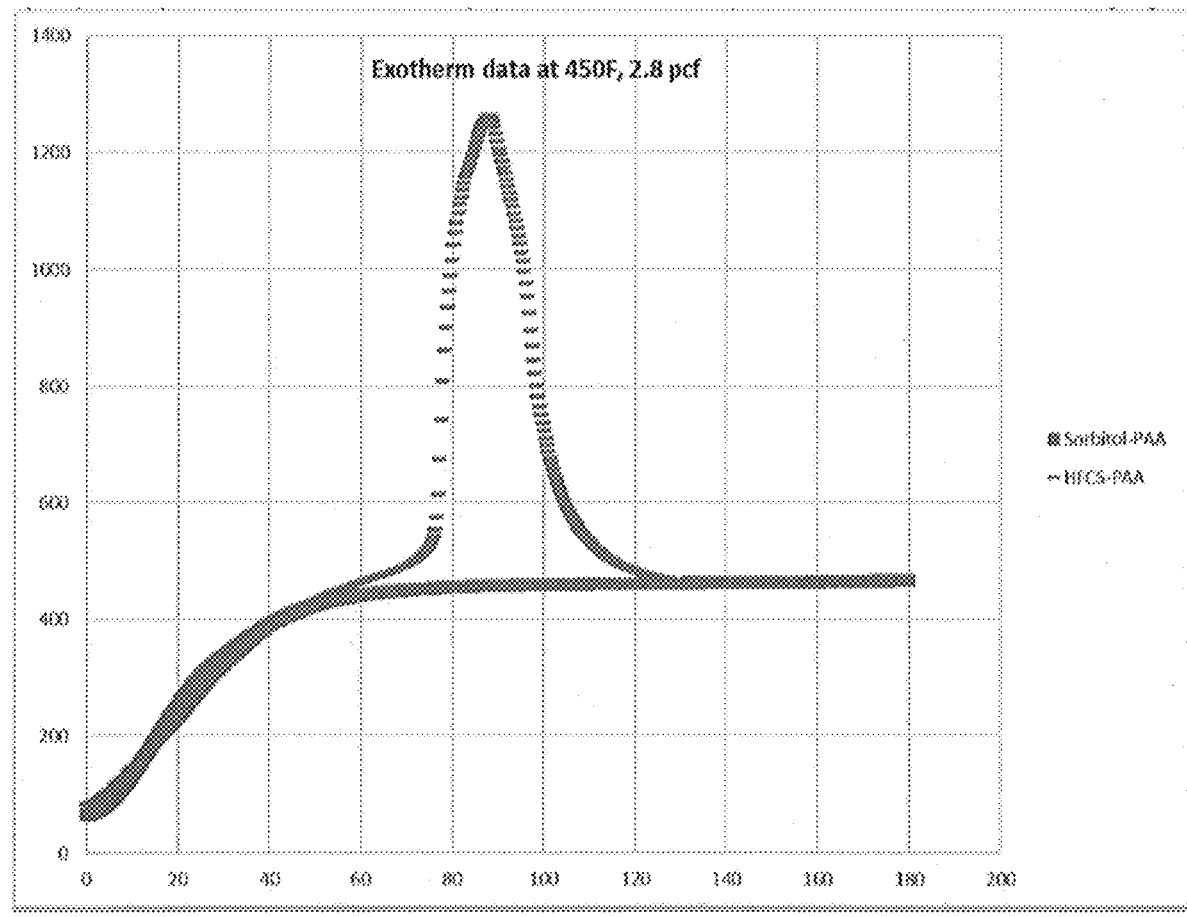
FIG. 5 shows exotherm plots for fiber-containing product Samples 1-2.

Experiment 1 compares the thermal stability of fiberglass insulations samples made with binder compositions having two different polyols. Sample 1 was made from a binder composition that included the sugar alcohol sorbitol, while Sample 2 was made from a binder composition that included a high-fructose corn syrup (HFCS) reducing sugar. Each sample was placed in an oven maintained at 232° C. (450° F.) while the sample's temperature was measured over 180 minutes. FIG. 5 shows exotherm plots of Samples 1 and 2, with only Sample 2 made with the HFCS-containing binder composition showing an exothermic peak after being in the oven for about 90 minutes. In contrast, Sample 1 produced an exotherm plot that showed a temperature plateau at the oven temperature (i.e., ~450° F.) after spending about 50 minutes in the oven.

The exotherm plots shown in FIG. 5 indicate that Sample 1 was thermally stable at 232° C. for the entire time measured. In contrast, the exothermic plot for Sample 2 showed a localized peak release of heat at approximately 90 minutes. This indicated that Sample 2 became thermally unstable at 232° C. after being held for approximately 90 minutes at that temperature. It also indicated that Sample 2 was significantly less thermally stable than Sample 1. The experiment demonstrates that fiber-containing products made with aqueous binder compositions that include sorbitol (a non-reducing sugar alcohol) and polyacrylic acid polymers at OH/COOH mole ratio of 1.5:1 are significantly more thermally stable than products made with binder compositions that replace the sorbitol with HFCS (a reducing sugar).

Experiment 2

Figure 6:
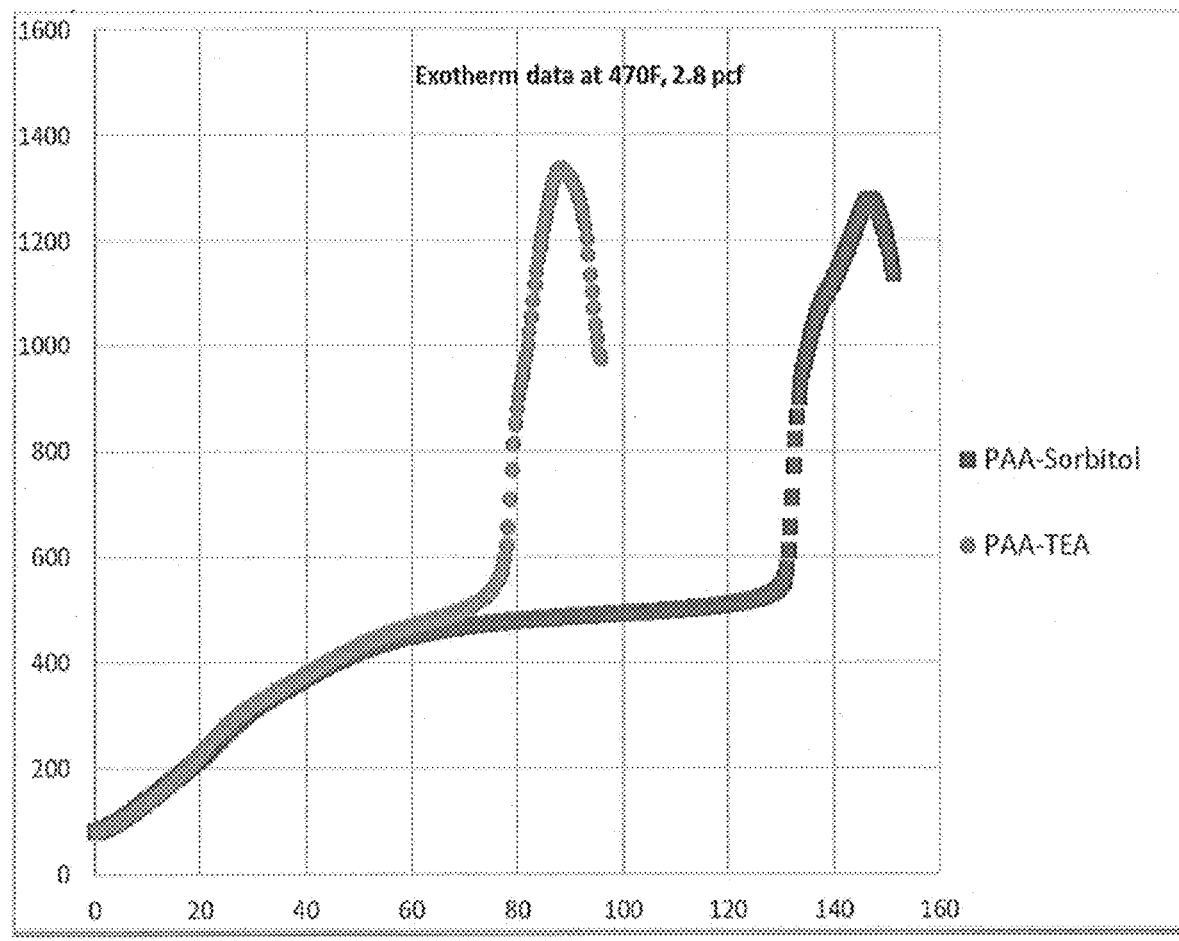
FIG. 6 shows exotherm plots for fiber-containing product Samples 3-4.

Experiment 2 compares the thermal stability of fiberglass insulations samples made with binder compositions having two different polyols. Sample 3 was similar to Sample 1, and was made from a binder composition that included sorbitol, while Sample 4 was made from a binder composition that included a triethanol amine (TEA) as the polyol component. Each sample was placed in an oven maintained at 243° C. (470° F.) while the sample's temperature was measured over 160 minutes. FIG. 6 shows the exotherm plots generated from Samples 3 and 4. Sample 3 produced an exotherm plot showing an exotherm peak occurring after the sample was in the oven for about 147 minutes, while Sample 4 showed an exotherm peak after about 90 minutes of oven time.

The exotherm plot for Sample 3 showed the sample formed from a sorbitol-containing binder composition had thermal stability in a 470° F. oven for well over 100 minutes. On the other hand, the plot for Sample 4 showed that the sample formed from a TEA-containing binder composition had a thermal stability of less than 100 minutes in the 470° F. oven. The experiment demonstrates that fiber-containing products made with binder compositions that include sorbitol (a non-reducing sugar) and polyacrylic acid polymers at OH/COOH mole ratios greater than 1.5:1 are significantly more thermally stable than products made with binder compositions that replace the sorbitol with triethanol amine (a nitrogen-containing polyol).

Experiment 3

Figure 7:
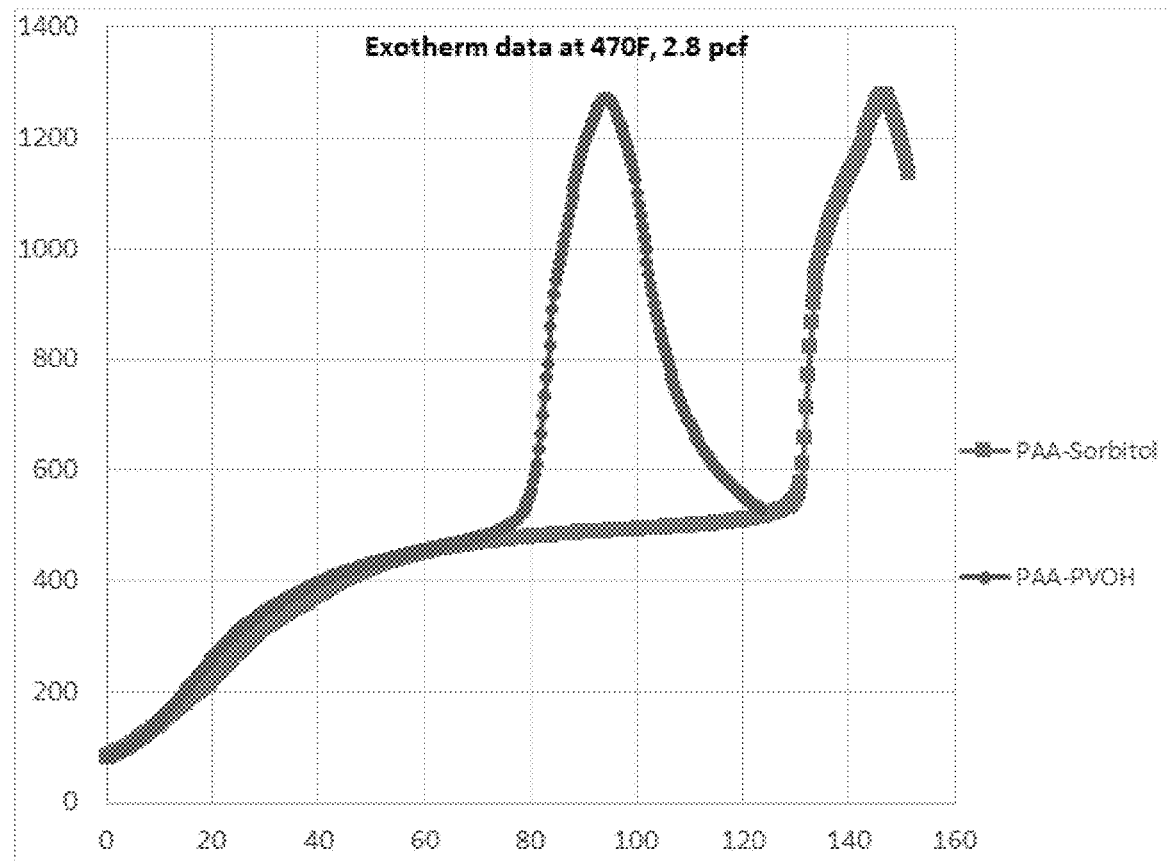
FIG. 7 shows exotherm plots for fiber-containing product Samples 5-6.

Experiment 3 compares the thermal stability of fiberglass insulations samples made with binder compositions having two different polyols. Sample 5 was similar to Sample 1, and was made from a binder composition that included sorbitol, while Sample 6 was made from a binder composition that included a polyvinyl alcohol (PVOH) as the polyol component. Each sample was placed in an oven maintained at 243° C. (470° F.) while the sample's temperature was measured over 160 minutes. FIG. 7 shows the exotherm plots generated from Samples 5 and 6. Sample 5 produced an exotherm plot showing an exotherm peak occurring after the sample was in the oven for about 147 minutes, while Sample 6 showed an exotherm peak after about 93 minutes of oven time.

The exotherm plot for Sample 5 showed the sample formed from a sorbitol-containing binder composition had thermal stability in a 470° F. oven for well over 100 minutes. On the other hand, the plot for Sample 6 showed that the sample formed from a PVOH-containing binder composition had a thermal stability of less than 100 minutes in the 470° F. oven. The experiment demonstrates that fiber-containing products made with binder compositions that include sorbitol (a non-reducing sugar alcohol) and polymeric polyacrylic acid acids at OH/COOH mole ratios greater than 1.5:1 are significantly more thermally stable than products made with binder compositions that replace the sorbitol with PVOH.

Experiment 4

Figure 8:
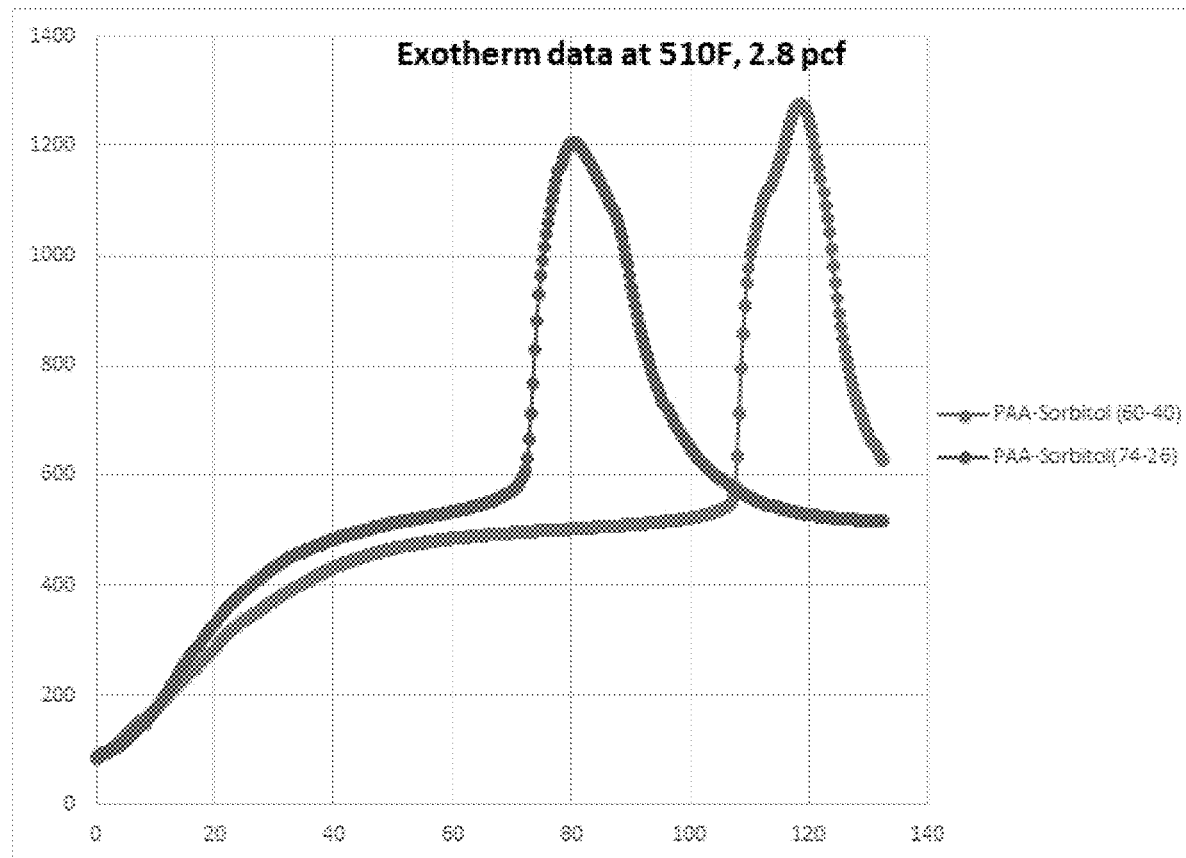
FIG. 8 shows exotherm plots for fiber-containing product Samples 7-8.

Experiment 4 compares the thermal stability of fiberglass insulations samples made with sorbitol/PAA binder compositions having two different mole ratios of OH/COOH. Sample 7 was similar to Sample 1, and was made from a sorbitol/PAA binder composition having an OH/COOH mole ratio of 1.5:1. Sample 8 was made from a sorbitol/PAA binder composition having a lower OH/COOH mole ratio of 0.83:1. Each sample was placed in an oven maintained at 265° C. (510° F.) while the sample's temperature was measured over 130 minutes. FIG. 8 shows the exotherm plots generated from Samples 7 and 8. Sample 7 produced an exotherm plot showing an exotherm peak occurring after the sample was in the oven for about 119 minutes, while Sample 8 showed an exotherm peak after about 81 minutes of oven time.

The exotherm plot for Sample 7 showed the sample formed from a sorbitol/PAA binder composition with a OH/COOH mole ratio of 1.5:1 had thermal stability in a 510° F. oven for well over 100 minutes. On the other hand, the plot for Sample 8 showed that the sample formed from a sorbitol/PAA-containing binder composition with a OH/COOH mole ratio less than 1:1 (i.e., 0.83:1) had a thermal stability of significantly less than 100 minutes in the 510° F. oven. The experiment demonstrates that fiber-containing products made with binder compositions that include sorbitol (a non-reducing sugar alcohol) and polyacrylic acid polymers at OH/COOH mole ratios greater than 1.5:1 are significantly more thermally stable than products made with binder compositions having a OH/COOH mole ratio less than or about 1:1.

Experiment 5

Experiment 5 compares the thermal stability of fiberglass insulations samples made with binder compositions having four different polycarboxylic acid components. On the other hand, all four binder compositions included sorbitol as the polyol component. Sample 9 was made with a binder composition that used polymaleic acid (HPMA) as the polymeric polycarboxylic acid, Sample 10 used a polyacrylic acid polymer (PAA), Sample 11 used a polyacrylic-co-maleic acid polymer (PAMA), and Sample 12 used a butane tetracarboxylic acid (BTCA).

Figure 9:
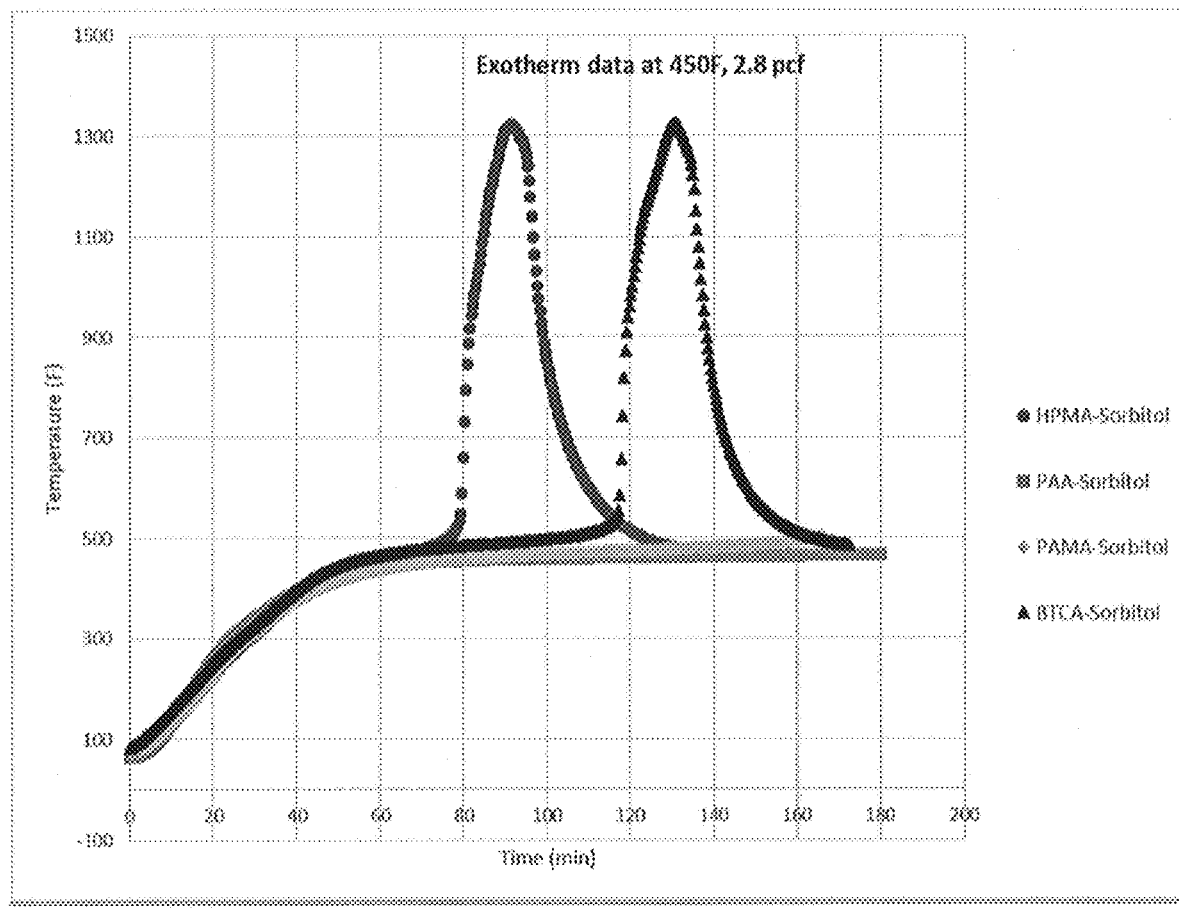
FIG. 9 shows exotherm plots for fiber-containing product Samples 9-12.

FIG. 9 shows the exotherm plots generated by Samples 9-12 over the course of 180 minutes as they resided in a 232° C. (450° F.) oven. Sample 9 (HMPA-Sorbitol) and Sample 12 (BTCA-Sorbitol) produced exotherm plots with localized exothermic peaks at approximately 90 minutes and 130 minutes, respectively. Sample 10 (PAA-Sorbitol) and Sample 11 (PAMA-Sorbitol) showed thermal stability throughout the 180 minute measurement period. The exotherm plots demonstrate that the thermal stability of the cured binders in the fiber-containing products depend on the choice of polymeric polycarboxylic acid. Homo- and co-polymers of polyacrylic acid demonstrated greater (longer) thermal stability than polycarboxylic acid reactants that included a polymaleic acid homopolymer or butane tetracarboxylic acid. The experiment demonstrates that the combination of sorbitol (a non-reducing sugar alcohol) and polyacrylic acid polymers provides unusually long thermal stability to cured binders in fiber-containing products according to present embodiments.

Experiment 6

Experiment 6 compares the thermal stability of fiberglass insulations samples (Samples 13-17) made with binder compositions having five different non-reducing sugar alcohols. On the other hand, all five binder compositions included the same polyacrylic acid polymer (a PAA with a molecular weight of 4500 g/mol) as the polycarboxylic acid component. Sample 13 was made with a binder composition that used sorbitol as the sugar alcohol, Sample 14 used mannitol, Sample 15 used xylitol, and Sample 16 used maltitol, and Sample 17 used glycerol.

Figure 10:
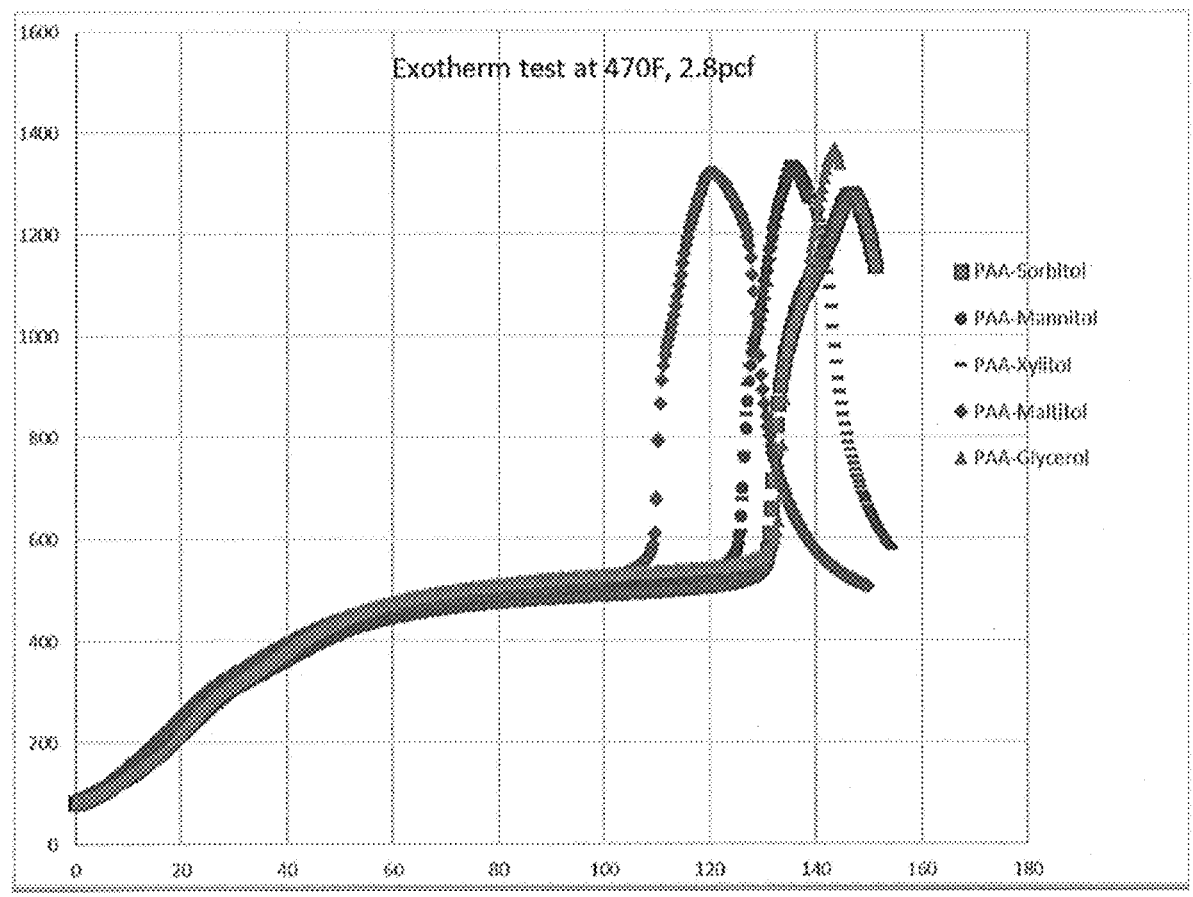
FIG. 10 shows exotherm plots for fiber-containing product Samples 13-17.

FIG. 10 shows exotherm plots of the five fiberglass insulation Samples 13-17 as they resided in a 243° C. (470° F.) oven for 160 minutes. The exothermic peaks for each of the Samples 13-17 occurred between about 120 and 150 minutes in the 470° F. oven. The exotherm plots showed that of the five samples, Sample 13 (PAA-Sorbitol) was the most thermally stable at approximately 150 minutes. All five samples showed thermal stability of greater than 100 minutes at the 470° F. oven temperature. Thus, the sugar alcohol and polyacrylic acid polymer aqueous binder compositions used to make all five samples provided greater thermal stability to the fiber-containing product than other binder compositions that substituted the sugar alcohol with HFCS (a reducing sugar) or triethanol amine (a nitrogen-containing polyol). They also provided greater thermal stability than binder compositions made from a combination of a sugar alcohol (sorbitol) and polycarboxylic acids other than polyacrylic acid polymers.

Experiment 7

Experiment 7 compares the tensile strengths of cured binder samples made from sorbitol and a polyacrylic acid polymer binder composition at two different curing temperatures. The dogbone-shaped samples were made by combining the (40:60 dry wt. %; 52 wt. % TS) sorbitol-PAA aqueous binder composition with borosilicate glass beads, with an average diameter of 1 mm. The bead-binder composition amalgam was poured into dogbone molds roughly 25 mm wide and 6 mm thick and cured. A first set of the dogbone shaped samples was cured at 210° C. for 20 minutes, while the second set of samples was cured at 230° C. for 20 minutes. Each dogbone sample included about 2.5 wt. % of the cured binder. The samples were further divided into unaged samples that were tested directly after being released from the molds, and humid-aged samples that were placed in a humidifying oven for 24 hours at 90° F. and 90% humidity. Each dogbone sample was tested in the same Instron tensile strength testing apparatus to measure its tensile strength (Harry W. Dietert Col.—Tensile Core Grip Assembly Part No. 610-7CA).

Figure 11:
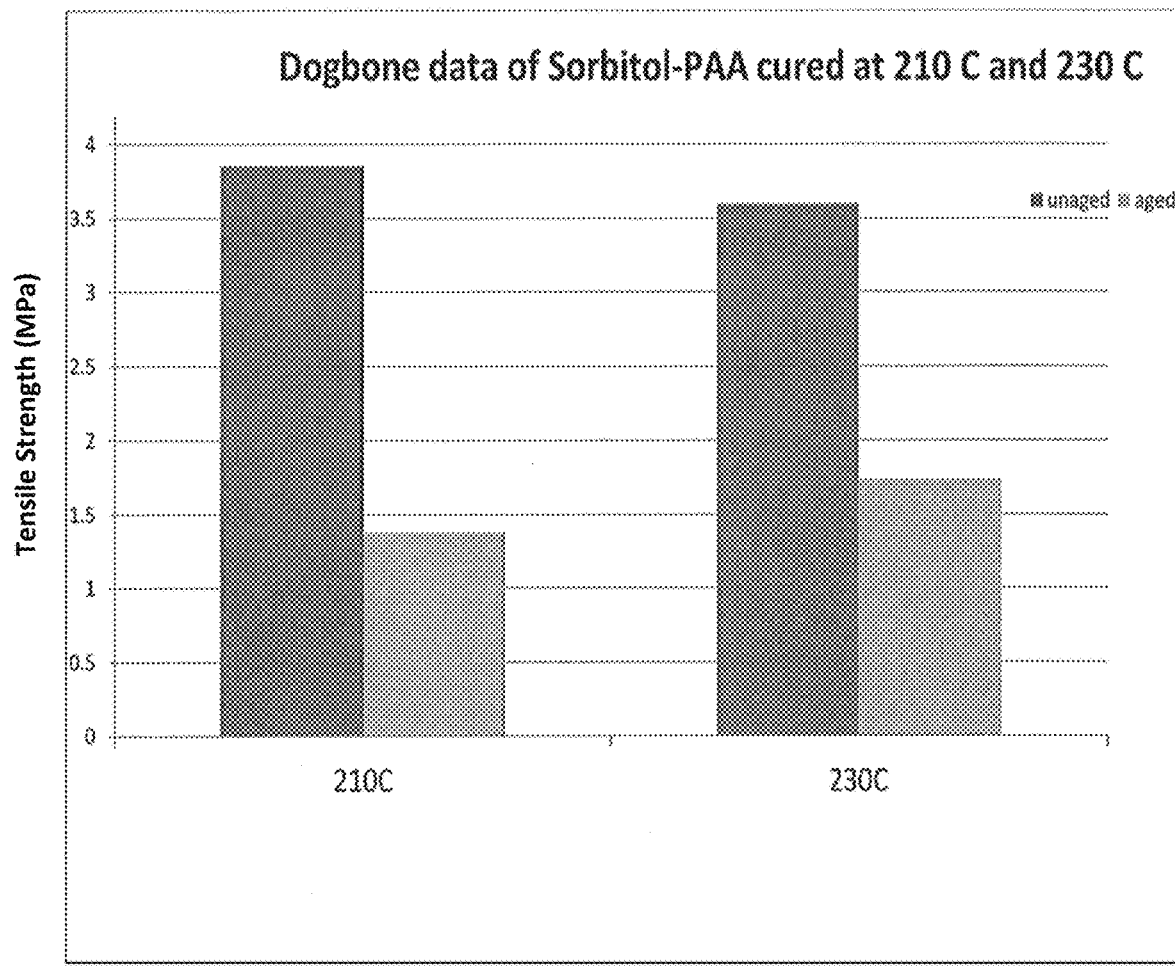
FIG. 11 shows tensile strength graphs for selected cured binder compositions.

The bar graphs shown in FIG. 11 demonstrate that the cured binder increased in humid-aged tensile strength by approximately 25% (1.75 MPa versus 1.3 MPa) when made at the higher curing temperature (230° C. versus 210° C.). Since the humid-aged conditions are likely to be experienced by fiber-containing products used as thermal insulation for articles that experience high temperatures such as hot pipes, ovens, and dryers, the higher curing temperatures can improve the mechanical properties of these products.

Experiment 8

Figure 12:
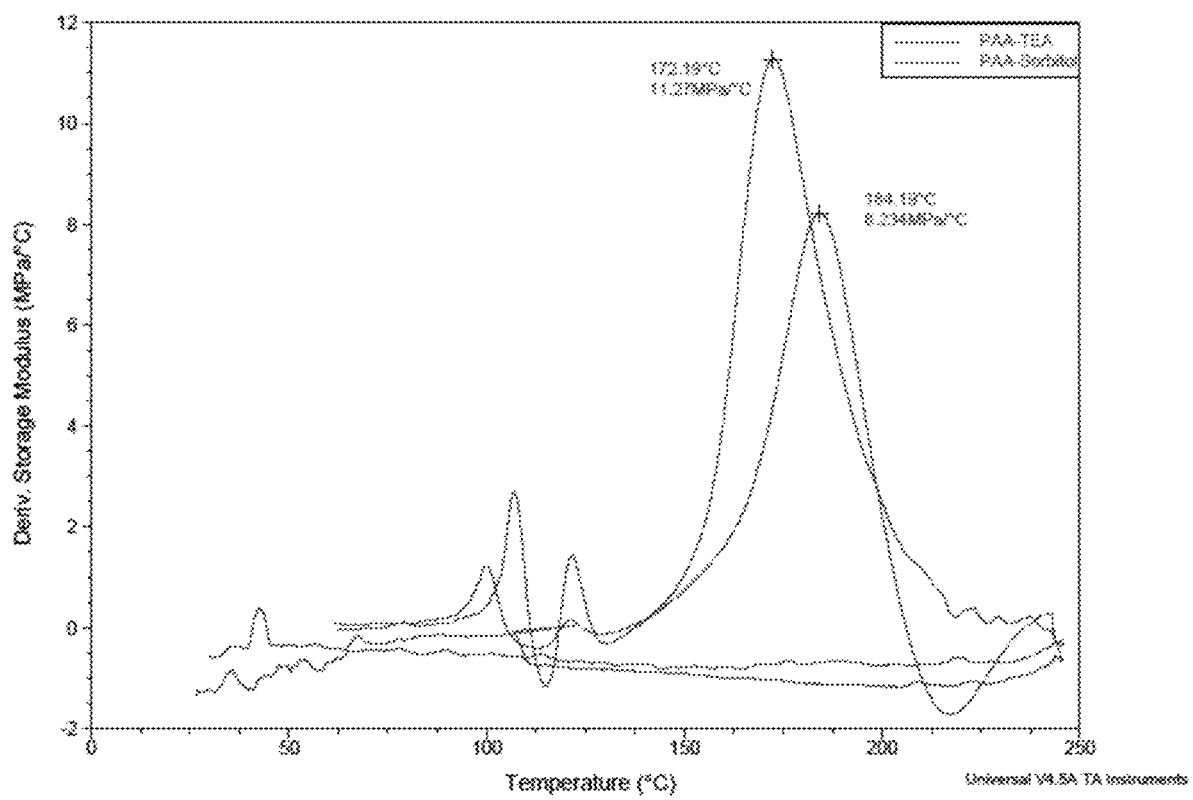
FIG. 12 shows a graph for the cure kinetics of selected binder compositions.

Experiment 8 compares the cure kinetics of binder compositions made with different hydroxyl-containing reactants. The first binder composition is a PAA-Sorbitol binder composition that includes polyacrylic acid (PAA) and sorbitiol. The second binder composition is a comparative PAA-TEA binder composition that includes the same polyacrylic acid (PAA) but replaces the sorbitol with triethanol amine (TEA). Samples were made by coating a specified amount of each of the binder composition on a piece of filter paper. The samples were then heated in a TA Instruments Q800 Dynamic Mechanical Analyzer at a rate of 4° C./minute in air using a dual-cantilever clamp. FIG. 12 shows a dynamic mechanical analysis (DMA) graph for the samples made with each binder composition. The DMA graph plots the derivative of the storage modulus (in MPa/° C.) versus temperature (in ° C.). The graph shows that the sample made with PAA-Sorbitol peaked 12° C. (21.6° F.) before the sample made with PAA-TEA. This experiment shows that the PAA-Sorbitol binder composition has faster cure kinetics than the PAA-TEA binder composition.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a heater" includes a plurality of such heaters, and reference to "the protrusion" includes reference to one or more protrusions and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

The invention claimed is:

1. A method of making a fiber-containing product, wherein the method comprises:
   contacting fibers with a binder composition to make a fiber-binder amalgam, wherein the binder composition comprises:
   a sugar alcohol; and
   a polyacrylic acid polymer,
   wherein the binder composition is characterized by a mole ratio of hydroxyl groups to carboxylic acid groups greater than or about 1.1:1; and
   curing the fiber-binder amalgam at a curing temperature greater than or about 230° C., wherein the curing fiber-binder amalgam releases volatile organic compounds in an amount less than or about 0.2 wt. % based on the weight of the binder composition, and wherein the cured binder contains less than or equal to 1 wt. % unpolymerized sugar alcohol.

2. The method of claim 1, wherein the curing temperature is greater than or about 240° C.

3. The method of claim 1, wherein the volatile organic compounds are formaldehyde free.

4. The method of claim 1, wherein the sugar alcohol comprises sorbitol.

5. The method of claim 1, wherein the polyacrylic acid polymer has a molecular weight greater than or about 1000 Daltons.

6. The method of claim 1, wherein the binder composition is neutralization-agent free.

7. The method of claim 1, wherein the fiber-containing product is characterized by a thermal stability of greater than or about 100 minutes at a temperature greater than or about 240° C.

8. The method of claim 1, wherein the fiber-containing product comprises thermal insulation.

9. A method of making a fiber-containing product, wherein the method comprises:
   contacting fibers with a binder composition to make a fiber-binder amalgam, wherein the binder composition comprises:
   a sorbitol; and
   a polymeric polycarboxylic acid polymer,
   wherein the binder composition is characterized by a mole ratio of hydroxyl groups to carboxylic acid groups greater than or about 1.1:1, and wherein the binder composition is catalyst free; and curing the fiber-binder amalgam at a curing temperature greater than or about 230° C. for a curing time less than or about 1 minute to form a cured binder in the fiber-containing product, wherein the cured binder is characterized by less than or about 1 wt. % unpolymerized sorbitol, and wherein the amount of polymeric polycarboxylic acid polymer that has not reacted with sugar alcohols in the cured binder is less than 5 wt. %.

10. The method of claim 9, wherein the fiber-containing product is characterized by greater than or about 5 wt. % of the cured binder.

11. The method of claim 9, wherein the fiber-containing product releases volatile organic compounds in an amount less than or about 0.2 wt. % based on the weight of the cured binder.

* * * * *